United States Patent
Schneider

(10) Patent No.: US 11,398,072 B1
(45) Date of Patent: Jul. 26, 2022

(54) METHOD OF OBTAINING A SET OF VALUES FOR A RESPECTIVE SET OF PARAMETERS FOR USE IN A PHYSICALLY BASED PATH TRACING PROCESS AND A METHOD OF RENDERING USING A PHYSICALLY BASED PATH TRACING PROCESS

(71) Applicant: Siemens Healthcare GmbH, Erlangen (DE)

(72) Inventor: Robert Schneider, Rosstal (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 16/714,920

(22) Filed: Dec. 16, 2019

(51) Int. Cl.
  *G06T 15/08* (2011.01)
  *G06T 15/00* (2011.01)

(52) U.S. Cl.
  CPC .......... *G06T 15/08* (2013.01); *G06T 15/005* (2013.01)

(58) Field of Classification Search
  CPC .............................. G06T 15/08; G06T 15/005
  See application file for complete search history.

(56) References Cited

U.S. PATENT DOCUMENTS

| | | | | |
|---|---|---|---|---|
| 5,583,975 A * | 12/1996 | Naka | .......... | G06T 15/06 345/643 |
| 5,847,711 A * | 12/1998 | Kaufman | .......... | G06T 15/10 345/424 |
| 6,111,582 A * | 8/2000 | Jenkins | .......... | G06T 15/40 345/421 |
| 6,144,383 A * | 11/2000 | Lichtenbelt | .......... | G06T 17/10 345/419 |
| 6,559,843 B1 * | 5/2003 | Hsu | .......... | G06T 15/06 345/421 |
| 6,597,359 B1 * | 7/2003 | Lathrop | .......... | G06T 15/06 345/420 |
| 6,664,961 B2 * | 12/2003 | Ray | .......... | H04N 13/275 348/E13.057 |
| 7,952,583 B2 * | 5/2011 | Waechter | .......... | G06T 17/005 345/426 |
| 8,040,350 B2 * | 10/2011 | Buyanovskiy | .......... | G06T 15/08 345/426 |

(Continued)

OTHER PUBLICATIONS

Krivánek, Jaroslav et al. "Radiance Caching for Efficient Global Illumination Computation" IEEE Transactions on Visualization and Computer Graphics, vol. 11, No. 5, pp. 550-561, Sep./Oct. 2005// DOI: 10.1109/TVCG.2005.83;.

(Continued)

*Primary Examiner* — Charles L Beard
(74) *Attorney, Agent, or Firm* — Harness, Dickey & Pierce, P.L.C.

(57) ABSTRACT

A method of obtaining a set of values for a respective set of parameters for use in a physically based rendering process to be implemented by a rendering apparatus to render an image of a dataset is described. The method includes defining a performance metric indicative of a performance of a rendering apparatus in implementing a physically based rendering process including path tracing to render an image using a given number of paths; and determining, for the rendering apparatus, a set of values for the set of parameters for which the performance metric satisfies a criterion.

15 Claims, 8 Drawing Sheets

(56) References Cited

U.S. PATENT DOCUMENTS

| | | | | |
|---|---|---|---|---|
| 8,243,073 B2* | 8/2012 | Mejdrich | | G06T 17/005 345/426 |
| 8,253,730 B1* | 8/2012 | Carr | | G06T 17/005 345/419 |
| 8,334,867 B1* | 12/2012 | Davidson | | G06F 3/04845 715/848 |
| 8,493,383 B1* | 7/2013 | Cook | | G06T 15/06 345/589 |
| 9,582,926 B2* | 2/2017 | Paladini | | G06T 15/06 |
| 9,760,690 B1* | 9/2017 | Petkov | | G06T 5/00 |
| 9,842,424 B2* | 12/2017 | Hecht | | G06T 1/60 |
| 9,875,569 B2* | 1/2018 | Yu | | G06T 15/08 |
| 9,984,493 B2* | 5/2018 | Zhou | | G06T 15/08 |
| 10,055,878 B2* | 8/2018 | Engel | | G06T 15/06 |
| 10,058,717 B2* | 8/2018 | Radulescu | | A61N 7/02 |
| 10,311,631 B2* | 6/2019 | Petkov | | G06T 15/06 |
| 10,546,415 B2* | 1/2020 | Petkov | | G06T 15/08 |
| 10,593,099 B2* | 3/2020 | Sudarsky | | G06T 15/08 |
| 10,607,393 B2* | 3/2020 | Petkov | | G16H 30/40 |
| 10,665,007 B2* | 5/2020 | Petkov | | A61B 5/0035 |
| 10,755,474 B1* | 8/2020 | Schneider | | G06T 15/506 |
| 10,893,262 B2* | 1/2021 | Vetter | | G06T 7/557 |
| 2002/0005850 A1* | 1/2002 | Osborne | | G06T 15/005 345/424 |
| 2002/0094809 A1* | 7/2002 | Watanabe | | H04W 16/18 455/67.11 |
| 2002/0113787 A1* | 8/2002 | Ray | | H04N 13/363 345/424 |
| 2002/0118206 A1* | 8/2002 | Knittel | | G06T 1/60 345/557 |
| 2002/0190984 A1* | 12/2002 | Seiler | | G06T 15/005 345/424 |
| 2003/0016218 A1* | 1/2003 | Zwicker | | G06T 5/002 345/424 |
| 2003/0114757 A1* | 6/2003 | Dow | | G01S 7/52034 600/437 |
| 2004/0081340 A1* | 4/2004 | Hashimoto | | G01S 7/52036 382/128 |
| 2004/0125103 A1* | 7/2004 | Kaufman | | G06T 15/08 345/419 |
| 2004/0263511 A1* | 12/2004 | West | | G06T 15/40 345/421 |
| 2005/0017971 A1* | 1/2005 | Ard | | G06T 17/10 345/423 |
| 2005/0234340 A1* | 10/2005 | Brock-Fisher | | A61B 8/065 600/458 |
| 2006/0056726 A1* | 3/2006 | Fujiwara | | G06T 15/08 382/276 |
| 2006/0071930 A1* | 4/2006 | Fujiwara | | G06T 15/08 345/419 |
| 2006/0071932 A1* | 4/2006 | Weese | | G06T 15/08 345/424 |
| 2006/0209066 A1* | 9/2006 | Kubara | | H04N 13/307 345/424 |
| 2006/0250395 A1* | 11/2006 | Kwon | | G06T 15/06 345/424 |
| 2006/0256111 A1* | 11/2006 | Chihoub | | G06T 15/08 345/424 |
| 2006/0274065 A1* | 12/2006 | Buyanovskiy | | G06T 17/005 345/623 |
| 2007/0024615 A1* | 2/2007 | Keller | | G06T 15/506 345/421 |
| 2007/0165769 A1* | 7/2007 | Goto | | A61B 6/032 378/4 |
| 2008/0024493 A1* | 1/2008 | Bordoloi | | G06T 15/08 345/423 |
| 2008/0030500 A1* | 2/2008 | Krishnan | | G06T 15/08 345/424 |
| 2008/0043018 A1* | 2/2008 | Keller | | G06T 15/506 345/426 |
| 2008/0075346 A1* | 3/2008 | Matsumoto | | G06T 15/08 382/131 |
| 2008/0122853 A1* | 5/2008 | Brown | | G06F 9/5088 345/522 |
| 2008/0252641 A1* | 10/2008 | Masumoto | | A61B 6/08 345/424 |
| 2008/0259079 A1* | 10/2008 | Boxman | | G06T 15/08 345/424 |
| 2008/0259080 A1* | 10/2008 | Masumoto | | G06T 15/50 345/426 |
| 2008/0262353 A1* | 10/2008 | Tian | | A61B 8/483 600/443 |
| 2009/0016641 A1* | 1/2009 | Paladini | | G06T 15/08 382/278 |
| 2009/0040220 A1* | 2/2009 | Gibbs | | G06T 15/06 345/424 |
| 2009/0096787 A1* | 4/2009 | Masumoto | | G06T 15/08 345/424 |
| 2009/0096789 A1* | 4/2009 | Peterson | | G06T 15/06 345/426 |
| 2009/0167763 A1* | 7/2009 | Waechter | | G06T 15/40 345/426 |
| 2009/0189898 A1* | 7/2009 | Dammertz | | G06T 15/55 345/426 |
| 2009/0213118 A1* | 8/2009 | Ha | | G06T 15/06 345/421 |
| 2009/0262132 A1* | 10/2009 | Peterson | | G06T 15/80 345/619 |
| 2009/0303236 A1* | 12/2009 | Buyanovskiy | | G06T 15/08 345/426 |
| 2010/0023460 A1* | 1/2010 | Hughes | | G06Q 40/06 705/36 R |
| 2010/0053162 A1* | 3/2010 | Dammertz | | G06T 15/06 345/522 |
| 2010/0168573 A1* | 7/2010 | Sherrill | | A61B 8/483 600/440 |
| 2010/0188403 A1* | 7/2010 | Mejdrich | | G06T 17/005 345/426 |
| 2010/0201685 A1* | 8/2010 | Mortimer | | G06T 15/08 345/424 |
| 2010/0215226 A1* | 8/2010 | Kaufman | | G06T 7/0012 382/128 |
| 2011/0069070 A1* | 3/2011 | Engel | | G06T 15/08 345/426 |
| 2011/0080412 A1* | 4/2011 | Miyata | | G06T 15/06 345/473 |
| 2011/0109629 A1* | 5/2011 | Ericson | | H04N 13/225 345/423 |
| 2011/0169830 A1* | 7/2011 | D'Amora | | G06T 15/08 345/424 |
| 2011/0227934 A1* | 9/2011 | Sharp | | G06F 9/5044 345/502 |
| 2011/0228055 A1* | 9/2011 | Sharp | | G06T 15/06 348/51 |
| 2011/0234583 A1* | 9/2011 | Bakalash | | G06T 15/06 345/419 |
| 2011/0301451 A1* | 12/2011 | Rohling | | A61B 8/0841 600/424 |
| 2012/0169728 A1* | 7/2012 | Mora | | G06T 15/06 345/419 |
| 2012/0176665 A1* | 7/2012 | Song | | G02B 30/36 359/558 |
| 2012/0212496 A1* | 8/2012 | Kulla | | G06T 15/506 345/501 |
| 2012/0236001 A1* | 9/2012 | Mejdrich | | G06T 17/005 345/426 |
| 2012/0245465 A1* | 9/2012 | Hansegard | | A61B 8/483 600/443 |
| 2013/0028500 A1* | 1/2013 | Takahashi | | A61B 6/5205 382/132 |
| 2013/0033571 A1* | 2/2013 | Steen | | G06T 19/20 348/46 |
| 2013/0135307 A1* | 5/2013 | Kawasaki | | G06T 15/08 345/424 |
| 2013/0135308 A1* | 5/2013 | Kho | | G06T 15/08 345/424 |
| 2013/0169641 A1* | 7/2013 | Schroecker | | G06T 15/80 345/426 |

(56) References Cited

U.S. PATENT DOCUMENTS

| | | | |
|---|---|---|---|
| 2013/0271757 A1* | 10/2013 | Kang | A61B 5/0066 356/300 |
| 2013/0328857 A1* | 12/2013 | Burley | G06T 15/06 345/418 |
| 2014/0176574 A1* | 6/2014 | Bakalash | G06F 9/5061 345/505 |
| 2014/0232719 A1* | 8/2014 | Wahrenberg | G06T 15/08 345/424 |
| 2014/0292757 A1* | 10/2014 | Tokuyoshi | G06T 15/06 345/426 |
| 2014/0340403 A1* | 11/2014 | Droske | G06T 15/06 345/426 |
| 2014/0362077 A1* | 12/2014 | Buyanovskiy | G06T 9/40 345/419 |
| 2015/0042656 A1* | 2/2015 | Roh | G06T 17/005 345/426 |
| 2015/0138201 A1* | 5/2015 | Brown | G06T 15/08 345/426 |
| 2015/0145864 A1* | 5/2015 | Buyanovskiy | G06T 19/20 345/426 |
| 2015/0206326 A1* | 7/2015 | Zhao | G06T 1/0007 382/131 |
| 2015/0215512 A1* | 7/2015 | Gautron | G06T 15/50 348/234 |
| 2015/0228110 A1* | 8/2015 | Hecht | G06T 15/08 345/419 |
| 2015/0262407 A1* | 9/2015 | Fursund | G06T 15/80 345/426 |
| 2015/0287233 A1* | 10/2015 | Shin | G06T 15/005 345/419 |
| 2015/0356743 A1* | 12/2015 | Kintou | G06K 9/6215 382/103 |
| 2016/0005226 A1* | 1/2016 | Brown | G06T 17/205 345/419 |
| 2016/0071309 A1* | 3/2016 | Shin | G06T 1/60 345/426 |
| 2016/0071311 A1* | 3/2016 | Kim | G06T 15/005 345/426 |
| 2016/0133042 A1* | 5/2016 | Kim | G06T 7/60 345/424 |
| 2016/0269723 A1* | 9/2016 | Zhou | G06T 5/002 |
| 2016/0321836 A1* | 11/2016 | Peng | G06T 15/06 |
| 2016/0343161 A1* | 11/2016 | Paladini | G06T 1/60 |
| 2016/0350963 A1* | 12/2016 | Petkov | H04L 65/4069 |
| 2016/0364901 A1* | 12/2016 | Balci | G06T 15/06 |
| 2017/0004267 A1* | 1/2017 | Svatos | G06N 7/005 |
| 2017/0053396 A1* | 2/2017 | Zhai | A61B 8/5207 |
| 2017/0061681 A1* | 3/2017 | Engel | G06T 15/06 |
| 2017/0115488 A1* | 4/2017 | Ambrus | G06T 11/60 |
| 2017/0200303 A1* | 7/2017 | Havran | G06T 15/06 |
| 2017/0235862 A1* | 8/2017 | Fukuda | G06F 17/18 703/2 |
| 2017/0294042 A1* | 10/2017 | Engel | G06T 15/08 |
| 2017/0339394 A1* | 11/2017 | Paulus, Jr. | G06T 15/06 |
| 2017/0352180 A1* | 12/2017 | Qiu | G06T 15/06 |
| 2017/0372448 A1* | 12/2017 | Wald | G06T 15/06 |
| 2018/0061111 A1* | 3/2018 | Engel | G06T 15/08 |
| 2018/0068590 A1* | 3/2018 | Mattausch | G09B 23/286 |
| 2018/0101013 A1* | 4/2018 | Moore | G06F 3/011 |
| 2018/0130249 A1* | 5/2018 | Shin | G06T 15/06 |
| 2018/0130253 A1* | 5/2018 | Hazel | G06T 17/10 |
| 2018/0225861 A1* | 8/2018 | Petkov | G06T 15/08 |
| 2018/0260997 A1* | 9/2018 | Petkov | A61B 5/055 |
| 2018/0308278 A1* | 10/2018 | Qiu | G06T 15/205 |
| 2018/0330538 A1* | 11/2018 | Petkov | G06T 15/08 |
| 2019/0088002 A1* | 3/2019 | Howson | G06T 15/06 |
| 2019/0088004 A1* | 3/2019 | Lucas | G06K 9/6202 |
| 2019/0096119 A1* | 3/2019 | Petkov | G06T 7/11 |
| 2019/0147639 A1* | 5/2019 | Sudarsky | A61B 5/0033 345/424 |
| 2019/0197715 A1* | 6/2019 | Rebecq | H04N 13/271 |
| 2019/0221027 A1* | 7/2019 | Petkov | G06T 15/06 |
| 2019/0272027 A1* | 9/2019 | Loffler | G06F 3/011 |
| 2019/0272667 A1* | 9/2019 | Roundhill | G06T 19/00 |
| 2019/0311531 A1* | 10/2019 | Stich | G06F 9/54 |
| 2019/0378324 A1* | 12/2019 | Wahrenberg | G06T 7/11 |
| 2020/0057828 A1* | 2/2020 | Harrison | G06F 16/5854 |
| 2020/0105048 A1* | 4/2020 | Rust | G06T 7/0014 |
| 2020/0175746 A1* | 6/2020 | Jones | G06T 15/06 |
| 2020/0184707 A1* | 6/2020 | Croxford | G06T 17/10 |
| 2020/0193682 A1* | 6/2020 | Saleh | G06T 15/005 |
| 2020/0193695 A1* | 6/2020 | Dingeldey | G06T 15/08 |
| 2020/0272229 A1* | 8/2020 | Sudarsky | G02B 27/017 |
| 2020/0304834 A1* | 9/2020 | Wang | H04N 21/845 |
| 2020/0342653 A1* | 10/2020 | Dupuis | G06T 15/005 |
| 2020/0368616 A1* | 11/2020 | Delamont | A63F 13/25 |
| 2020/0372697 A1* | 11/2020 | Mange | G06T 15/005 |
| 2021/0003735 A1* | 1/2021 | Georgadze | G01V 5/005 |
| 2021/0012561 A1* | 1/2021 | Sunkavalli | G06T 7/55 |
| 2021/0105313 A1* | 4/2021 | Wang | H04N 21/85406 |
| 2021/0244374 A1* | 8/2021 | Zhao | A61B 6/482 |
| 2021/0279942 A1* | 9/2021 | Petkov | G06T 7/50 |
| 2022/0044472 A1* | 2/2022 | Engel | G06T 5/20 |

OTHER PUBLICATIONS

Levoy, M. et al. "Light Field Rendering" SIGGRAPH '96 Proceedings of the 23rd annual conference on Computer graphics and interactive techniques, pp. 31-42, 1996// ISBN:0-89791-746-4// DOI: 10.1145/237170.237199;.

Munkberg J. et al., "Texture Space Caching and Reconstruction for Ray Tracing", ACM Trans. Graph., vol. 35, No. 6, Article 249, Nov. 2016;.

Zwicker M. et al., "Recent Advances in Adaptive Sampling and Reconstruction for Monte Carlo Rendering", Computer Graphics Forum 34 (2), 667-681, 2015;.

Ward, Gregory J. et al. "A Ray Tracing Solution for Diffuse Interreflection" Computer Graphics, vol. 22, No. 4, Aug. 1988 // DOI: 10.1145/54852.378490;.

Keller A. et. al., "Path Space Filtering. In Monte Carlo and Quasi-Monte Carlo Methods 2014", , R. Cools and D. Nuyens (Eds.);.

* cited by examiner

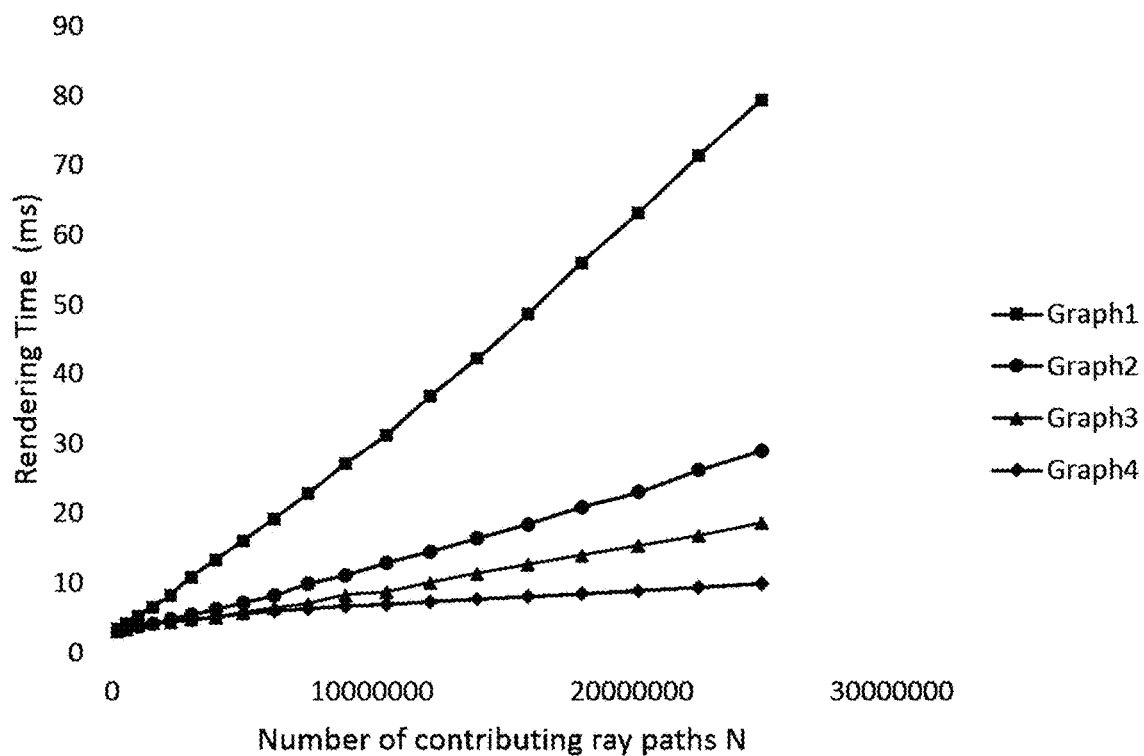
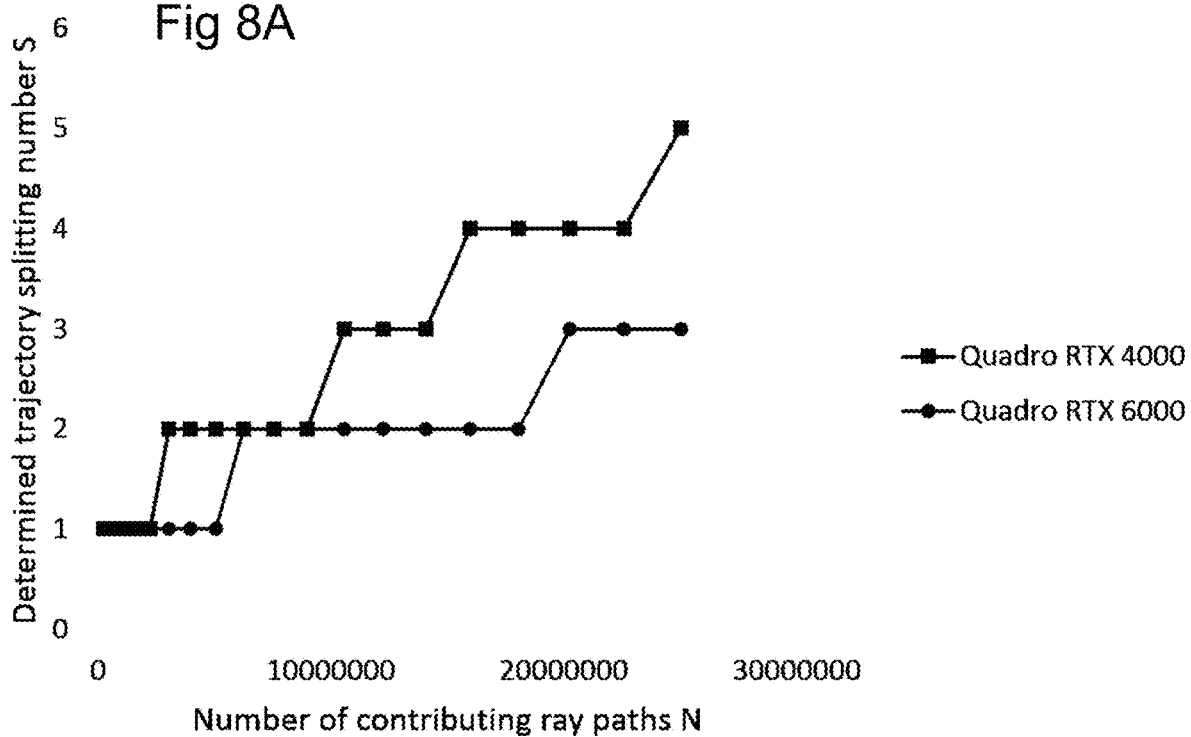

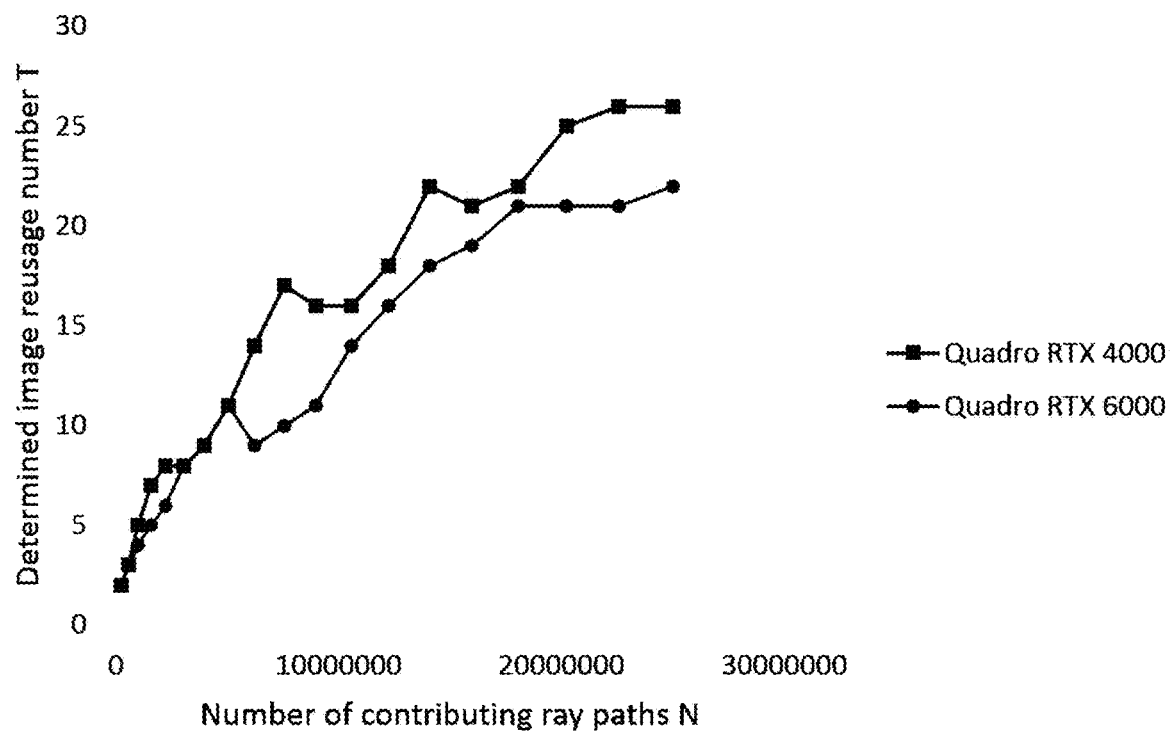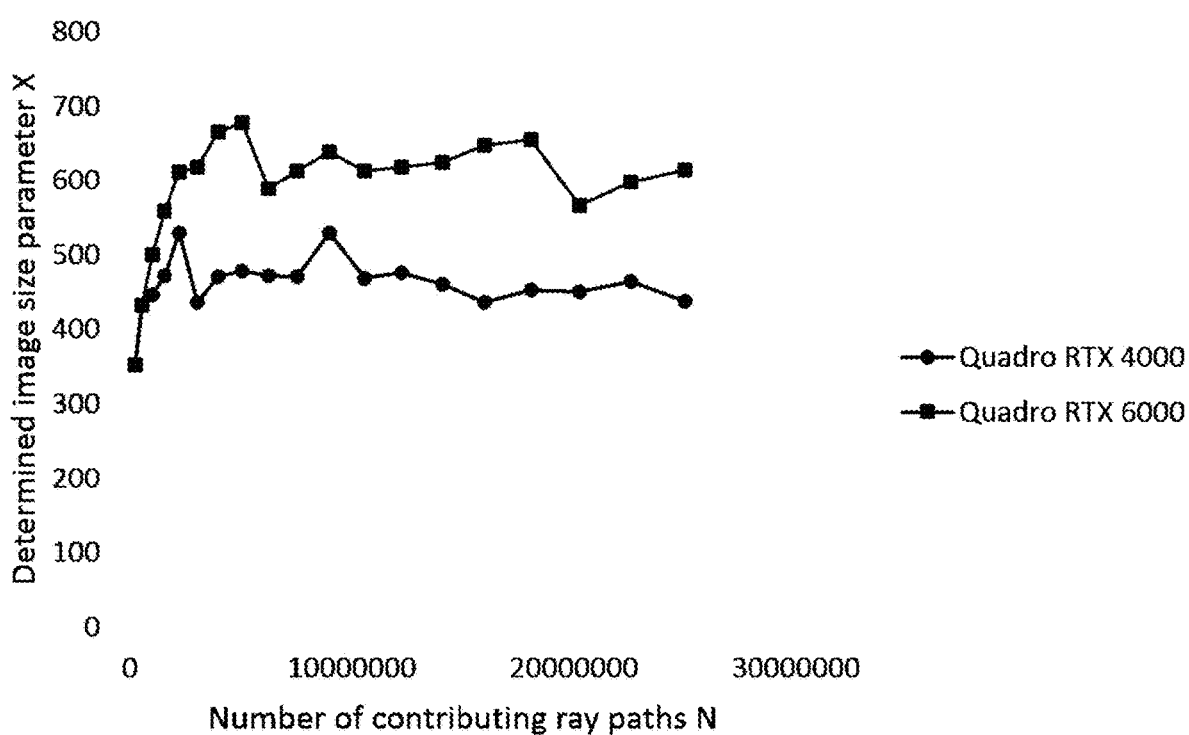

METHOD OF OBTAINING A SET OF VALUES FOR A RESPECTIVE SET OF PARAMETERS FOR USE IN A PHYSICALLY BASED PATH TRACING PROCESS AND A METHOD OF RENDERING USING A PHYSICALLY BASED PATH TRACING PROCESS

FIELD

Embodiments of the invention generally relate to a computer-based method of obtaining a set of values for parameters of a physically based path tracing process and a method of volume rendering using such values.

BACKGROUND

Computer-based visualizations of datasets representing a volume may be generated using techniques generally known as rendering. Rendering may, for example, be used to visualize the results of a medical imaging process, such as a CT scanning process or the like. In the field of medicine, rendering may allow for a radiologist, a surgeon or a therapist to visualize and thereby understand and interpret data representing anatomy. Providing a visualization of such data may, for example, be used for diagnosis, teaching, patient communication etc.

Visualization of volume data is also applied in numerous other technical fields, for example in geological, industrial quality assurance and scientific simulations.

Physically based volumetric rendering is a type of rendering that mimics the real-world interaction of light with 3D objects, where the 3D objects are described by a volumetric dataset. Physically based volumetric rendering based on Monte Carlo path tracing is a rendering technique for light transport computations, where the natural light phenomena are modelled using a stochastic process. Physically based volumetric rendering models the inter-reflection of light between positions within a volume and can produce a number of global illumination effects by providing a solution to the rendering integral equation. Physically based rendering hence may result in more realistic images, as compared to images produced from traditional volume rendering methods, such as ray casting, which do not produce global illumination effects. The increased realism of the images can improve user performance on perceptual tasks. For example, photorealistic rendering of medical data may be easier for a radiologist, a surgeon or a therapist to understand and interpret, and may support communication with the patient and educational efforts.

Evaluation of the rendering integral equation in physically based volumetric rendering based on Monte Carlo path tracing may require many, e.g. thousands, of stochastic samples per pixel to produce an acceptably noise-free image. As a result, path tracing techniques have, in some examples, been considered too slow for certain applications.

Some attempts have been made to decrease the time taken for an acceptable image to be produced by physically based volumetric rendering. One approach is to simplify the underlying rendering, such that the complex physically based rendering algorithm is replaced by an algorithm that approximates it. For example, features such as shadows can be added to classic volume rendering. However, such techniques may surrender some of the benefits in image realism provided by a physically based rendering technique.

SUMMARY

According to a first embodiment of the present invention, there is provided a method of obtaining a set of values for a respective set of parameters for use in a physically based rendering process to be implemented by a rendering apparatus to render an image of a dataset, the method comprising: defining a performance metric indicative of a performance of a given rendering apparatus in implementing a physically based rendering process comprising path tracing to render an image using a given number of paths; and determining, for the given rendering apparatus, a given set of values for the set of parameters for which the performance metric satisfies a predetermined criterion.

According to a second embodiment of the invention there is provided a computer readable medium comprising a set of instructions which when performed by a computerized rendering apparatus cause a method of rendering a dataset by use of a physically based rendering process comprising path tracing to be implemented by the computerized rendering apparatus, wherein the physically based rendering process comprises using a given set of values for a respective set of parameters of the physically based rendering process; and wherein the given set of values is determined such that, when the physically based rendering process is implemented by the rendering apparatus to render an image using a given number of paths, a performance metric indicative of a performance of the rendering apparatus in implementing the physically based rendering process satisfies a predetermined criterion.

According to a third embodiment of the invention there is provided a computer-readable medium comprising a set of computer-readable instructions which when executed by a computer cause a method of obtaining a set of values for a respective set of parameters for use in a physically based rendering process comprising path tracing to be implemented by a computerized rendering apparatus to render an image of a dataset to be performed, wherein the method comprises: defining a performance metric indicative of a performance of a given rendering apparatus in implementing a physically based rendering process to render the image using a given number of paths; and determining, for the given rendering apparatus, a given set of values for the set of parameters for which the performance metric satisfies a predetermined criterion.

According to a fourth embodiment of the invention there is provided apparatus comprising a processor and a storage comprising a set of computer-readable instructions which when executed by the processor cause the processor to perform a method of obtaining a set of values for a respective set of parameters for use in a physically based rendering process comprising path tracing to be implemented by a rendering apparatus to render an image of a dataset, wherein the method comprises: defining a performance metric indicative of a performance of a given rendering apparatus in implementing a physically based rendering process to render the image using a given number of paths; and determining, for the given rendering apparatus, a given set of values for the set of parameters for which the performance metric satisfies a predetermined criterion.

According to an embodiment of the invention, a method of obtaining a set of values for a set of parameters for use in a physically based rendering process to be implemented by a rendering apparatus to render an image of a dataset, comprises:

defining a performance metric indicative of a performance of the rendering apparatus in implementing a physically based rendering process including path tracing to render an image using a number of paths; and determining, for the rendering apparatus, the set of values for the set of parameters for which the performance metric satisfies a set criterion.

According to an embodiment of the invention, a computer readable medium stores a set of instructions which, when performed by a computerized rendering apparatus, cause a method of rendering a dataset by use of a physically based rendering process including path tracing to be implemented by the computerized rendering apparatus, the physically based rendering process including using a set of values for a respective set of parameters of the physically based rendering process;

and wherein the given set of values is determined such that, when the physically based rendering process is implemented by the rendering apparatus to render an image using a given number of paths, a performance metric indicative of a performance of the rendering apparatus in implementing the physically based rendering process satisfies a criterion.

According to an embodiment of the invention, a computer-readable medium stores a set of computer-readable instructions, which when executed by a computer, cause a method of obtaining a set of values for a respective set of parameters for use in a physically based rendering process including path tracing to be implemented by a computerized rendering apparatus to render an image of a dataset to be performed, wherein the method comprises:

defining a performance metric indicative of a performance of a computerized rendering apparatus in implementing a physically based rendering process to render the image using a number of paths; and determining, for the computerized rendering apparatus, a set of values for the set of parameters for which the performance metric satisfies a criterion.

According to an embodiment of the invention, an apparatus comprises:

a processor; and a storage storing a set of computer-readable instructions which, when executed by the processor, cause the processor to perform obtaining of a set of values for a respective set of parameters for use in a physically based rendering process including path tracing to be implemented by a rendering apparatus to render an image of a dataset, the obtaining of the set of values comprising:

defining a performance metric indicative of a performance of a rendering apparatus in implementing a physically based rendering process to render the image using a number of paths; and determining, for the rendering apparatus, a set of values for the set of parameters for which the performance metric satisfies a criterion.

BRIEF DESCRIPTION OF THE DRAWINGS

The present invention will now be described, by way of example only, with reference to the following figures, in which:

FIG. 7 shows a graph of a rendering time for rendering an image against a number of paths used to render the image for an example rendering apparatus by use of a path tracing process when using differing values for parameters of the path tracing process; and FIGS. 8A to 8C show graphs comparing values obtained by example methods described herein for respective parameters of a path tracing process for two different GPUs.

DETAILED DESCRIPTION OF THE EXAMPLE EMBODIMENTS

Figure 1:
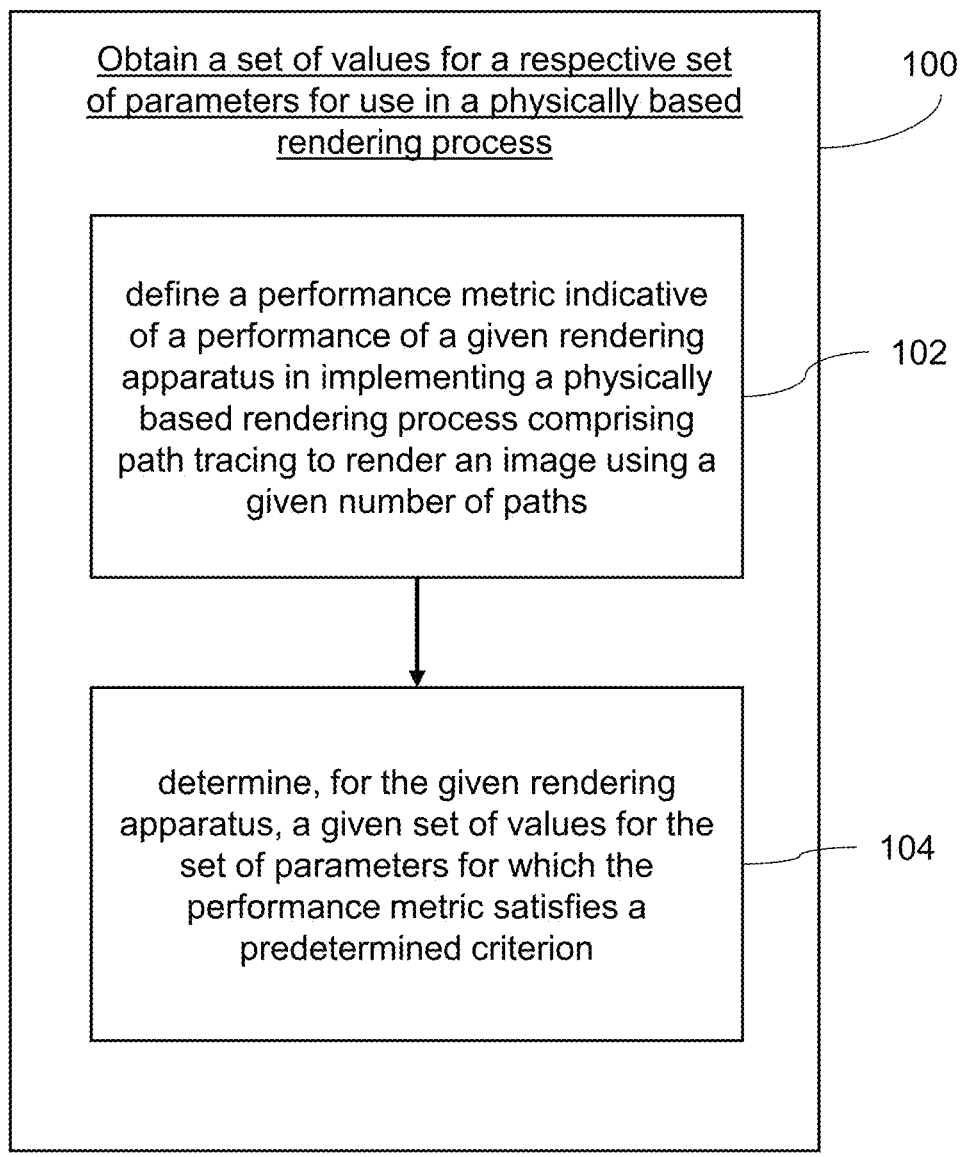
FIG. 1 illustrates a flow chart representation of a method of obtaining a set of values for use in a physically based rendering process, according to examples described herein.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Nonlimiting examples of the non-transitory computer-readable medium include, but are not limited to, rewriteable nonvolatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable nonvolatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to a first embodiment of the present invention, there is provided a method of obtaining a set of values for a respective set of parameters for use in a physically based rendering process to be implemented by a rendering apparatus to render an image of a dataset, the method comprising: defining a performance metric indicative of a performance of a given rendering apparatus in implementing a physically based rendering process comprising path tracing to render an image using a given number of paths; and determining, for the given rendering apparatus, a given set of values for the set of parameters for which the performance metric satisfies a predetermined criterion.

The set of parameters may be for use in a physically based volume rendering process to render an image of a volumetric dataset.

The physically based rendering process may comprise: a trajectory splitting technique and the set of parameters comprise a trajectory splitting number relating to a number of paths into which a given ray traced in the physically based rendering process is split; and/or a temporal image reusage technique and the set of parameters comprise an image reusage number relating to a number of previously rendered images from which light data created during the physically based rendering process is reused; and the set of parameters may comprise an image size parameter relating to a number of pixels for which light data is computed in the physically based rendering process.

The light data may comprise light irradiance data for respective positions in the dataset.

The physically based rendering process may comprise the trajectory splitting technique and the image reusage technique, and the set of parameters may comprise the trajectory splitting number, the image reusage number, and the image size parameter, wherein the given number of paths used to render the image is related to the set of parameters according to the equation:

$$N = S*T*R*X^2$$

wherein: N is the given number of paths; S is the trajectory splitting number; T is the image reusage number; X is the image size parameter; and R is an image ratio relating a width of the image to a height of the image.

The performance metric may relate to a rendering time or a number of computations involved in implementing the physically based rendering process to render the image, and, the predetermined criterion may be that the performance metric is minimized.

Determining the given set of values for the set of parameters may comprise: evaluating a value of the performance metric for each of a plurality of combinations of values for the set of parameters; and selecting as the given set of the values for the set of parameters a combination of values of the plurality of combinations of values which results in the performance metric satisfying the predetermined criterion.

Determining the given set of values for the set of parameters may comprise: determining a performance function configured to output a value for the performance metric for the given apparatus when a set of values are input to the function; and determining a minimum value output by the performance function and a set of values which when input to the performance function result in the performance function outputting the minimum value; and selecting the set of values which when input to the performance function result in the performance function outputting the minimum value as the given set of values.

Determining the given set of values for the set of parameters may comprise determining a function which is configured to output the given set of values for a given number of paths when the given number of paths is input into the function.

The performance metric may comprise: a first term dependent on a rendering time or on a number of computations involved in implementing the physically based rendering process to render the image; and one or more weighted terms dependent on one or more respective values of the set of parameters; and the predetermined criterion may be that the performance metric is minimized.

The method may comprise performing the step of determining a given set of values for which the performance metric satisfies a predetermined criterion a plurality of times to thereby obtain a plurality of sets of values for the set of parameters; wherein each set of values of the plurality of sets of values is a given set of values for implementing the physically based rendering process by a rendering apparatus of a plurality of different rendering apparatuses.

Determining each set of values of the plurality of sets of values may comprise determining a respective function which is configured to output, for a given rendering apparatus of the plurality of rendering apparatuses, the given set of values for a given number of paths when the given number of paths is input into the function.

According to a second embodiment of the invention there is provided a computer readable medium comprising a set of instructions which when performed by a computerized rendering apparatus cause a method of rendering a dataset by use of a physically based rendering process comprising path tracing to be implemented by the computerized rendering apparatus, wherein the physically based rendering process comprises using a given set of values for a respective set of parameters of the physically based rendering process; and wherein the given set of values is determined such that, when the physically based rendering process is implemented by the rendering apparatus to render an image using a given number of paths, a performance metric indicative of a performance of the rendering apparatus in implementing the physically based rendering process satisfies a predetermined criterion.

The given set of values may be determined from a plurality of predetermined sets of values, each predetermined set of values of the plurality of predetermined sets of values corresponding with a respective type of rendering apparatus of a plurality of types of rendering apparatus, wherein determining the given set of values comprises: determining a type of the rendering apparatus; determining if the type of the rendering apparatus corresponds with a type of rendering apparatus of the plurality of types of rendering apparatus; and if the type of the rendering apparatus corresponds with a type of rendering apparatus of the plurality of types of rendering apparatus, selecting the predetermined set of values corresponding to the determined type of the rendering apparatus as the given set of values;

and if the type of the rendering apparatus does not correspond with a type of rendering apparatus of the plurality of types of rendering apparatus, determining the given set of values based on at least the determined type of the rendering apparatus.

Determining the given set of values based on the determined type of the rendering apparatus may comprise: determining a type of rendering apparatus of the plurality of types of rendering apparatus which is most similar to the determined type of the rendering apparatus and selecting the predetermined set of values corresponding to the type of rendering apparatus which is most similar to the determined type of the rendering apparatus as the given set of values; or assigning as the given set of values a first set of values, wherein respective values of the first set of values are an average of respective values of two or more predetermined sets of values of the plurality of predetermined sets of values; or assigning as the given set of values a first predetermined set of values of the plurality of predetermined sets of values, wherein the first predetermined set of values is predetermined to provide that a sum of the performance metric of two or more types of rendering apparatus of the plurality of types of rendering apparatus when using the second set of values in the path tracing process is minimized; or determining the given set of values by determining, for the determined type of the rendering apparatus, a set of values for which the performance metric satisfies a predetermined criterion.

According to a third embodiment of the invention there is provided a computer-readable medium comprising a set of computer-readable instructions which when executed by a computer cause a method of obtaining a set of values for a respective set of parameters for use in a physically based rendering process comprising path tracing to be implemented by a computerized rendering apparatus to render an image of a dataset to be performed, wherein the method comprises: defining a performance metric indicative of a performance of a given rendering apparatus in implementing a physically based rendering process to render the image using a given number of paths; and determining, for the given rendering apparatus, a given set of values for the set of parameters for which the performance metric satisfies a predetermined criterion.

According to a fourth embodiment of the invention there is provided apparatus comprising a processor and a storage comprising a set of computer-readable instructions which when executed by the processor cause the processor to perform a method of obtaining a set of values for a respective set of parameters for use in a physically based rendering process comprising path tracing to be implemented by a rendering apparatus to render an image of a dataset, wherein the method comprises: defining a performance metric indicative of a performance of a given rendering apparatus in implementing a physically based rendering process to render the image using a given number of paths; and determining, for the given rendering apparatus, a given set of values for the set of parameters for which the performance metric satisfies a predetermined criterion.

FIG. 1 illustrates a flow chart representation of an example method 100 of obtaining a set of values for a respective set of parameters for use in a physically based rendering process. The physically based rendering process is to be implemented by a rendering apparatus to render an image of a dataset. In examples, the dataset comprises a volumetric dataset and the rendering process comprises a physically based volume rendering process. In other examples the dataset may comprise an opaque dataset as e.g. an opaque mesh and the rendering process may comprise a physically based surface rendering process.

In some examples, the physically based rendering process uses a trajectory splitting technique in which a given ray which is traced in the physically based rendering process is split into a plurality of different paths upon interacting with a 3D position in the volume. The data from these different sub-paths may be combined, e.g. averaged, to obtain a light data value for the 3D position in the volume at which the path splitting occurs. Each of the sub-paths may contribute information to be used in determining the light data value. For example, each sub-path may contribute a radiance contribution to be used in computing an irradiance value. The irradiance value may be considered an approximation to the irradiance at the 3D position in the volume where the path splitting occurs. In such examples, a trajectory splitting number defines the number of paths into which a given ray traced in the physically based path tracing process is split. The trajectory splitting number is an integer which may be equal to one, such that there is no trajectory splitting, or may be equal to more than one. Using a trajectory splitting number of more than one may provide for the path tracing to be more computationally efficient in some examples, as will be described in more detail below. The trajectory splitting number may be one of the set of parameters for use in the path tracing process.

The physically based path tracing process may additionally or alternatively use a temporal data reusage technique wherein light data that was created during the computation of one or more previously rendered images may be reused in rendering the image. An image reusage number defines a number of previous images from which the light data created during the computation of the previous images is reused. The image reusage number is an integer. In examples herein, a value of one for the image reusage number indicates that no light data created during the computation of previous images are reused in rendering the present image, while a value of greater than one for the image reusage number indicates that the light data created during the computation of at least one previous image is used in rendering the present image. For example, if the image reusage number equals 2, rendering of the present image makes use of light data, e.g. radiance contributions or approximated irradiance values, created during the computation of the previous image. The image reusage number is another example of a parameter of the set of parameters for use in the physically based path tracing process.

Another example of a parameter of the set of parameters is an image size parameter related to a size of a plane for which light data are computed by the path tracing process. In examples, the image size parameter may be an integer number defining a number of pixels that are arranged in a plane along a given direction where a path is traced from a viewing point for each pixel in the plane. For example, the image size parameter may be an integer number of pixels along the width of the plane. Where the plane is not the same number of pixels high as it is wide, an image ratio parameter defining a ratio between a height and a width of the plane may be defined and may also be one of the set of parameters for use in the physically based rendering process.

The method 100 comprises, at block 102, defining a performance metric indicative of a performance of a given rendering apparatus in implementing a physically based rendering process to render an image using a given number of paths.

The performance metric may, for example, relate to a rendering time, i.e. a time taken for the rendering apparatus to render the image by the physically based rendering process using the given number of paths. In another example, the performance metric may relate to a number of computations involved in rendering the image. In other examples, the performance metric may take another form, as will be discussed in more detail below.

The total number of paths contributing to the image may be considered an indicator of a quality of the image. Thus, the performance metric may, in some examples, be considered indicative of a performance of the rendering apparatus in rendering an image of a given quality. For example, the performance metric may be indicative of time taken for the rendering apparatus to render an image of a given quality. In another example, the performance metric may be an overall energy consumed by the rendering apparatus during the rendering process. In yet other examples, the performance metric may itself comprise a combination of metrics, for a combination of a rendering time and an energy consumed by the rendering apparatus.

The method comprises, at block 104, determining, for the given rendering apparatus, a given set of values for the set of parameters for which the performance metric satisfies a predetermined criterion.

In one example, the predetermined criterion is that the performance metric is minimized. Thus, for example, where the performance metric relates to a rendering time or a number of computations involved in the rendering, the given set of values for the set of parameters may, respectively, be the set of values which results in the quickest rendering time, or the lowest number of computations being completed by the rendering apparatus to render the image using the given number of paths.

In an example, the path tracing process uses a trajectory splitting number, an image reusage number and an image size parameter.

In such examples, the number of paths contributing the image is dependent on the values of the trajectory splitting number, the image reusage number and the image size parameter. That is, using trajectory splitting to split traced light paths into more than one path contributes more paths to the total number of paths used to render the image. Similarly, using light data from previous images in rendering the image provides more paths to the total number of paths used to render the image. Rendering an image comprising light data collected for a plane comprising a larger number of pixels also contributes more paths to the total number of paths used to render the image since each pixel typically requires paths to be traced to obtain its light data. However, the values used for the set of parameters can influence the performance, e.g. the speed, of the rendering algorithm. Thus, in some examples, the method may be considered to involve formulating and solving an optimization problem, where this problem relates to how best to partition computational resources between different acceleration techniques, e.g. trajectory splitting and temporal data reusage, to achieve a given image quality with the least amount of work.

Determining the given set of values for the set of parameters which allows the performance metric to satisfy the predetermined criterion may comprise evaluating a value of the performance metric for each of a plurality of combinations of values for the set of parameters. The given set of the values may then be selected as a combination of values of the plurality of combinations of values which results in the performance metric satisfying the predetermined criterion. For example, different values for the set of parameters may be tested to find the set of parameters for which a minimum rendering time is measured.

Alternatively, determining the given set of values for the set of parameters may comprise determining a performance function configured to output a value for the performance metric for the given apparatus when a set of values are input to the function. For example, a performance function may be designed to model the performance of the rendering apparatus when different values for the set of parameters are used. A minimum value output by the performance function may be determined and the set of values which result in the performance function outputting the minimum value selected as the given set of values. A minimum of this function may be found numerically, for example.

In some examples, the determining, at block 104, of the given set of values for the set of parameters may comprise determining a function which is configured to output the given set of values when receiving as an input a given number of paths to be used to render the image. For example, the function may be determined by measuring a plurality of sets of values which minimize the performance function for different respective numbers of paths. The values making up the set of values may be interpolated, e.g. by linear interpolation, to provide values for the set of parameters at numbers of paths for which no values were measured. Accordingly, the function may take an arbitrary number of paths as an input and output a set of values for the set of parameters which would result in a minimized rendering time for the given rendering apparatus to render an image with the given number of paths.

In some examples, the method may be performed for each type of rendering apparatus of a plurality of different types of rendering apparatus. For example, a function may be determined for each of the plurality of types of rendering apparatus which outputs values for the set of parameters for a particular type of rendering apparatus to be used to render the image when a number of paths is input into the function.

In some examples, the performance function may comprise further terms in addition to a term representing a rendering time or the like. For example, the performance metric may comprise a first term dependent on a rendering time or on a number of computations involved in implementing the physically based path tracing process to render the image, and one or more weighted terms dependent on one or more respective values of the set of parameters. The predetermined criterion may be that the performance metric is minimized. The addition of the weighted terms may be used such that the performance function takes into account that, in certain circumstances, certain values may be preferred in terms of the image quality they provide. For example, certain considerations involved in the rendering process may make a low value for the trajectory splitting number or for the image reusage number to be preferred in certain circumstances, as will be discussed below in more detail.

Figure 2:
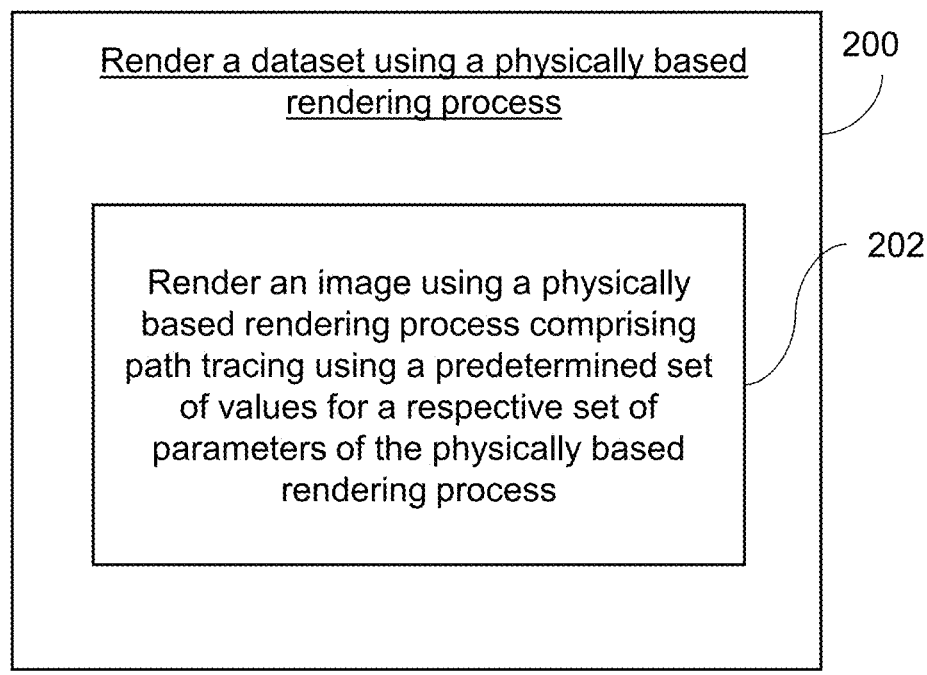
FIG. 2 illustrates a flow chart representation of a method of rendering a dataset by a physically based path tracing process using a set of values determined according to example methods described herein.

FIG. 2 shows an example method 200 of a rendering apparatus implementing a physically based rendering process for rendering an image of a volumetric dataset.

The example method 200 comprises using a given set of values for a respective set of parameters of the physically based rendering process.

The given set of values is determined such that, when the physically based rendering process is implemented by the rendering apparatus to render the image using a given number of paths, a performance metric indicative of a performance of the rendering apparatus in implementing the physically based rendering process satisfies a predetermined criterion.

In examples, the given set of values is predetermined according to the example method 100 described above. For example, the example method 100 may result in a predetermined set of values configured to allow the performance metric to satisfy the predetermined criterion when the predetermined set of values is used by the rendering apparatus in the rendering process to render the image. Using this predetermined set of values in the method 200 allows the predetermined criterion for the performance metric to be satisfied, e.g. to render an image using a given number of paths in minimal time.

The method 200 may comprise determining a type of the rendering apparatus and determining the given set of values to be used in the rendering process accordingly. The method 200 may comprise determining if the determined type of rendering apparatus corresponds with any of a plurality of types of rendering apparatus for which a respective plurality of predetermined sets of values have been predetermined. For example, after determining the type of the rendering apparatus, a look-up may be performed to determine if there is an appropriate set of predetermined values corresponding to the type of the rendering apparatus and, if so, selecting this predetermined set of values for use. In examples, as described above, a function configured to output a set of values for a given number of paths may be predetermined, so the look-up may comprise determining if there is a predetermined function corresponding with the determined type of the rendering apparatus. The type of the rendering apparatus may, for example, be an identifier of a type of GPU or CPU used to perform the rendering process. In other examples, the rendering apparatus may comprise a field programmable gate array (FPGA) or an application-specific integrated circuit (ASIC). In yet other examples, the rendering apparatus may comprise multiple hardware devices, for example a combination of one or more CPUs and/or one or more GPUs which both contribute to the underlying computations. The type of rendering apparatus may thus be indicative of the type of hardware device or combination of hardware devices which the rendering apparatus comprises.

If no predetermined set of values corresponds with the determined type of the rendering apparatus, then the given set of values may be determined based on the determined type of the rendering apparatus and the plurality of predetermined sets of values.

For example, if there is no predetermined set of values corresponding with the determined type of rendering apparatus, the method may comprise determining which of the plurality of rendering apparatuses for which a predetermined set of values exists is most similar to the determined type of rendering apparatus. The predetermined set of values corresponding to the rendering apparatus which is most similar to the determined type of rendering apparatus may then be selected for use in the rendering process.

In another example, a first set of values may be assigned as the given set of values, where each of the respective values of the first set of values is an average of respective values of two or more predetermined sets of values of the plurality of predetermined sets of values. For example, the first set of values may be a default set of values for use when the determined type of rendering apparatus does not have a corresponding predetermined set of values. The sets of values making up the default set of values may each be an average of that value in all of the predetermined sets of values. For example, the average trajectory splitting number in the predetermined sets of values may be 2, for the given number of paths. Thus, in this example, where no predetermined set of values corresponds with the specific set of values, a trajectory splitting number of 2 may be used. Values for the other parameters may be selected in the same manner.

In another example, where none of the predetermined sets of values corresponds with the determined type of the rendering apparatus, a first predetermined set of values of the plurality of predetermined sets of values may be selected where the first predetermined set of values minimizes a sum of the respective values of the performance metric when used by two or more rendering apparatuses of the plurality of rendering apparatuses. For example, different sets of values may be tested for each of the rendering apparatus to obtain a value of the performance metric for a respective rendering apparatus when using each respective set of values. The performance metric for each of the rendering apparatuses when using a given set of values may be summed. The set of values which results in this sum of the values of the performance metric across the plurality of different types of rendering apparatus being minimized may be determined. This set of values may then be selected for use when none of the plurality of types of rendering apparatus corresponds with the determined type of the rendering apparatus.

In yet another example, where it is determined that none of the plurality of types of rendering apparatus corresponds with the determined type of the rendering apparatus, the given set of values may be determined according to method described with reference to FIG. 1. That is, for example, the example method 100 may be performed "on the fly" to determine the given set of values for use with the rendering apparatus being used. The given set of values determined in this way may be stored for use in subsequent implementations of the rendering method on the rendering apparatus.

Example methods as described with reference to FIG. 1 may thus provide for obtaining a set of values to be used for parameters of a path tracing process in order to render an image of a given quality while satisfying a given performance criterion, e.g., rendering the image in reduced or minimal time. This may be particularly useful for "real time" rendering applications such as virtual reality or augmented reality applications, where high quality images may need to be rendered at a high framerate. One example application may be for rendering high quality images with a high framerate in stereo. For example, for application in a Microsoft Hololens device high quality stereo images at a framerate of 60 FPS may be needed to be produced for stable operation.

Example methods may result in a given set of values for use with a particular rendering apparatus or a plurality of given sets of values each for use with a rendering apparatus of a plurality of rendering apparatuses. Example methods may also result in a function for providing a given set of values for a given rendering apparatus when using a given number of paths.

Examples methods as described with reference to FIG. 2 allow implementation of a rendering process using path tracing where a set of values predetermined in the manner described with reference to FIG. 1 may be used. Thus, an appropriate predetermined set of values for a given rendering apparatus implementing the rendering may be used to, for example, reduce or minimize the time for the given rendering apparatus to render an image of given quality. Some example methods also provide for determining or selecting a set of values for use with a rendering apparatus for which no corresponding set of values has been predetermined. Thus, the time required to render a high-quality image can be reduced or minimized for a given rendering apparatus by selecting or determining a set of values appropriate to the given rendering apparatus.

The physically based rendering process to which the set of parameters relate is, in examples, a stochastic process which involves modelling the paths of a plurality of rays through a dataset which is to be rendered.

Figure 3:
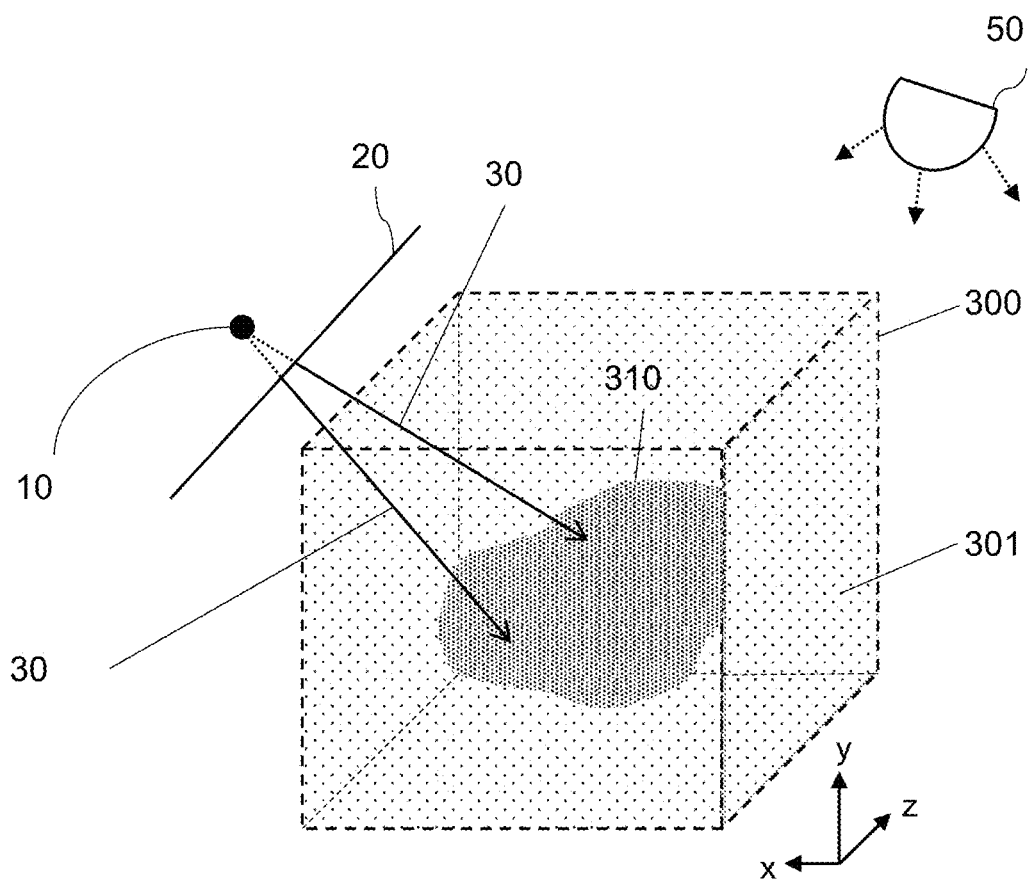
FIG. 3 illustrates schematically a volumetric dataset and a method of rendering the volumetric dataset according to examples described herein.

FIG. 3 illustrates schematically a volumetric dataset 300 to be rendered by a physically based process to which some example methods described herein relate. The volumetric dataset 300 may be referred to herein as the volume 300.

The volumetric dataset 300 may comprise a discrete sampling of a scalar field. For example, the volumetric dataset 300 may comprise a medical dataset. Such a medical dataset may be received by loading from a memory, sensors, and/or other sources. Such a medical dataset may represent a part of a patient, for example a human or animal patient. In general, any scanning modality which will produce a volumetric dataset may be used to produce the volumetric dataset 300. For example, the scanning modality may comprise the use of computed tomography (CT), or of magnetic resonance imaging (MRI). In some examples a scanning modality comprising the use of positron emission tomography (PET), single photon emission computed tomography (SPECT), ultrasound, or another scan modality may be used. Scan data may be provided in the form of multiple two-dimensional (2D) scans or may be formatted from a scan. In some examples, the volumetric dataset 300 is a DICOM dataset created by scanning at least a portion of a patient using a scanning modality. In other examples, values making up the volumetric dataset 300 may represent geological data (e.g. gathered using seismic data), or as part of industrial quality assurance (e.g. gathered using industrial x-ray scans). In other examples, the volumetric dataset 300 may comprise values representing an object produced via a scientific model rather than measured values representing a physical object. In other examples, a volumetric dataset may comprise data relating to a non-scalar field. For example, the volumetric dataset may comprise data relating to a velocity field produced by a fluid simulation.

In examples, the volumetric dataset 300 may comprise data formatted as a plurality of voxels 301. The voxels 301 may, for example, be in a uniform or non-uniform grid, or may be arranged in some other type of geometry (e.g., polar coordinate format). Each voxel 301 may represent a scalar value, such as scalar value obtained by sampling a scalar field, as described above. The type of scalar value represented by each voxel 301 may be dependent on the means by which the volumetric dataset 300 is obtained. For example, where a CT scanner is used to produce the volumetric dataset 300, the dataset may comprise Hounsfield values. In this example, the volumetric dataset 300 comprises a representation of an object 310, which may be a representation of a portion of a medical patient or the like.

In examples, each voxel 301 in the volume 300 is classified and assigned visual parameter data. In one example, the visual parameter data assigned to each voxel 301 comprises an opacity and a color. In examples, the visual parameter data assigned to each voxel 301 is determined via use of a transfer function, as mentioned in examples above. A transfer function may assign visual parameter data to the voxel 301 based on, for example, the scalar value of the voxel 301. In some examples, additional properties related to the voxel 301, such as a gradient of the scalar values of the volumetric dataset 301 at the voxel, may be used an input into a transfer function and therefore may affect the visual parameter data assigned to the voxel 301.

In other examples, a transfer function may assign to a given point in the volume 300 one or more of: a scattering coefficient, a specular coefficient, a diffuse coefficient, a scattering distribution function, a bidirectional transmittance distribution function, a bidirectional reflectance distribution function, and color information. These parameters may be used to derive a transparency, reflectivity, surface roughness, and/or other properties of the surface of the given point. These surface material properties may be derived based on scalar values of the volumetric dataset at the rendering location, and/or based on user-specified parameters.

The example volume rendering method represented by FIG. 3 comprises defining a viewpoint 10 with respect to the volumetric dataset 300. A viewing plane 20 is also defined and located in front of the viewpoint 10. The viewing plane 20 comprises a number of pixels (not shown in FIG. 3), e.g. arranged in a grid, and allows construction of a visualization of the volumetric dataset 300, as viewed from the viewpoint 10.

In examples, a rendering algorithm may model an illumination effect by modelling a light source 50 illuminating the volume 300. The illumination effect may be taken into account when accumulating the opacity and color values along the ray 30. The light source 50 may be a point source, a directional light source, or may comprise a light map. The simulation light source may also be any other kind of light source—e.g. a model of any object which emits light—or a combination of multiple different light sources. In some examples, parts of the volumetric dataset itself may emit light. In some examples, the light source may comprise a high definition light map. The light map in some examples may have six sides corresponding to outer sides of the volumetric dataset where the volume is cuboidal, for example.

In path tracing, such as Monte Carlo path tracing, light propagation through the volume 300 is simulated, including simulating scattering and absorption, by tracing a plurality, for example millions, of simulated light rays 30. Data gathered from the traced light paths is used to generate display values for the pixels making up the image of the volume 300. In examples, the gathering of data by tracing light paths may be separate from the collection of this gathered data into a final image. This fact may be exploited in some acceleration techniques, such as trajectory splitting and temporal data reusage, which are mentioned above and will now be discussed in further detail.

Path tracing methods may employ certain techniques to speed up the process of rendering an image of a given quality. One example of such a technique, which is used in path tracing methods described herein, is referred to as "trajectory splitting". When trajectory splitting is employed, during the path tracing process, a path that interacts with the scene, i.e. the dataset, at a given position will start multiple sub-paths at that position. The multiple sub-paths may then be used to approximate the underlying illumination integral at the position by averaging the results of tracing the sub-paths. Using a larger number of sub-paths during the path tracing technique may provide for more accurate results for the underlying illumination integral at the position and thus may provide for a higher quality rendered image if employed across the rendering.

The parameter S is defined herein as the integer number of paths that are generated for a position where trajectory splitting occurs with S sub-paths. In the special case where S=1, the trajectory splitting becomes a single path. The parameter S may be used to define an implementation of trajectory splitting during path tracing in example methods herein.

Figure 4A:
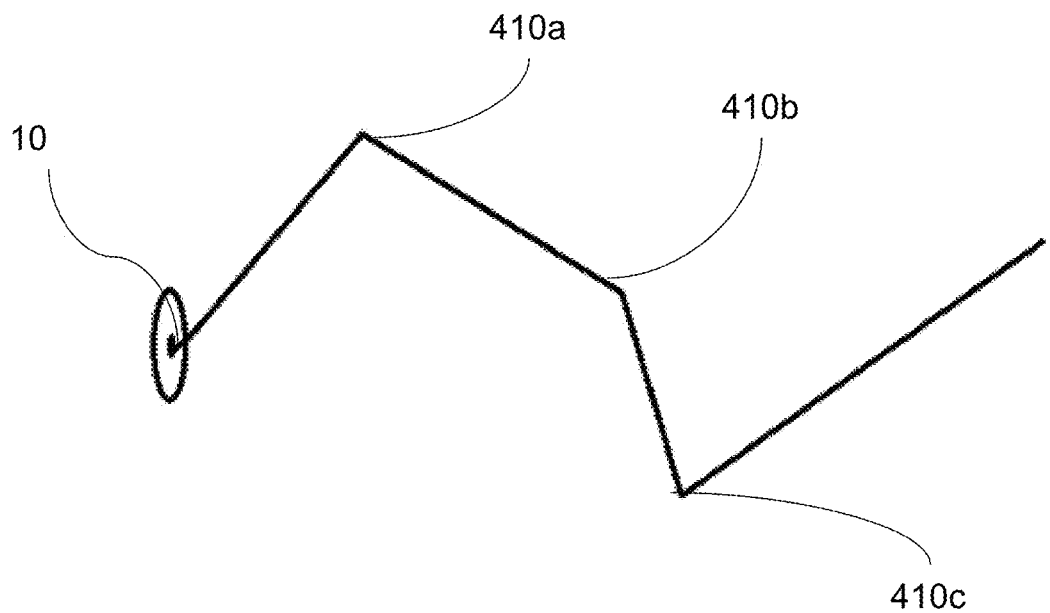
FIGS. 4A and 4B illustrate schematically a trajectory splitting technique for use in example methods of rendering a dataset described herein.
Figure 4B:
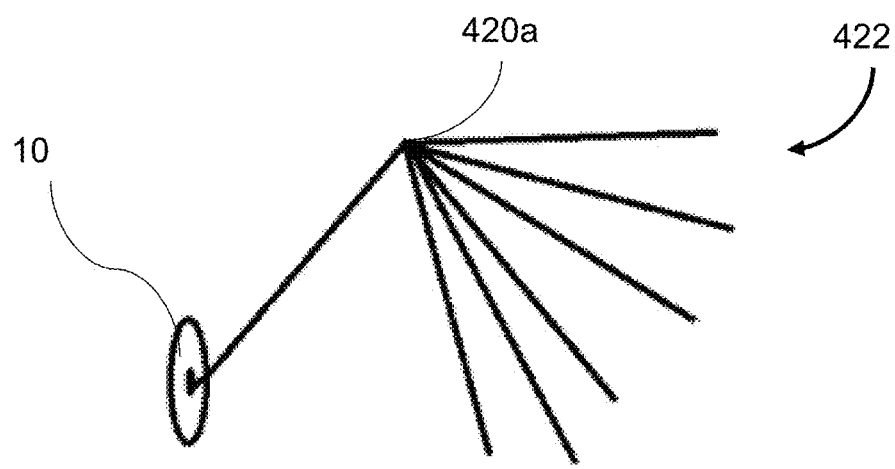

FIGS. 4A and 4B illustrate the principle behind trajectory splitting. A trajectory splitting number S defines a number of sub-paths which are started when a ray being traced in the path tracing process, starting from the viewpoint 10, interacts with a position in the volumetric dataset 300. FIG. 4A shows an example in which S=1 and thus where there is no trajectory splitting. First, second and third interaction points 410a, 410b, 410c respectively are shown in FIG. 4A. FIG. 4B illustrates an example of tracing a ray in which trajectory splitting is used with S=6. Upon interacting with the volume, the ray is split into six sub-paths 422. In FIG. 4B, only a first interaction point 420a with the volume is shown. It should be noted that a path tracing technique using trajectory splitting where a number S sub-paths are created at a given position where a path interacts with the volume 300 may be considered to provide S individual paths to be used in the path tracing for solving the illumination integral. Some portions of the S paths, i.e. prior to the splitting, may be identical to one another. However, using trajectory splitting (i.e. having S>1) can be seen to provide more information for solving the illumination integral compared to a single path alone, thus providing for a higher quality rendered image.

Another example of a technique for speeding up the rendering process may be referred to as temporal data reusage. This involves, when rendering an image of the volume, reusing data obtained for rendering a previous image of the volume. For example, the path tracing process may be used to generate light data, as e.g. light irradiance, relating to 3D positions in the volume. As the scene to be rendered changes, for example, due to the viewpoint moving or a change in the lighting of the volume, some of the previous light data may still be valid for use in computing a 2D image of the volume, which may be a photo-realistic image of the volume in certain examples. Temporal data reusage involves reusing these previous light data to improve the efficiency of producing a rendered image of the volume, since fewer "new" paths may need to be traced to produce an image of a given quality. A number of previous images for which path tracing data may be reused in rendering a given image is one example parameter which may be used to characterize an implementation of a temporal data reusage technique. This parameter is labelled herein as T. As used herein, T=1 means that no previous images are reused and T>1 means that T−1 previous images are reused.

Employing a temporal data reusage technique may involve determining whether paths used to render previous images are still valid for the current image to be rendered or whether such paths have since been invalidated, e.g. due to a change to the volume or the viewpoint. When such data can be reused, it can greatly speed up the computation of a rendered image. Larger values of T mean that more previous images are used in rendering an image. Temporal data reusage, as well as trajectory splitting, may in some examples be used in conjunction with other acceleration techniques, such as path space filtering, in order to further accelerate the rendering process.

As mentioned above, some example path tracing methods may separate the computation of light information from the computation of a final rendered 2D image. Therefore, in a first pass, paths may be traced so that light information, in the form of e.g. an irradiance value, related to 3D points in the volume, can be gathered, and in a second pass, the gathered light information can be used to compute the final 2D rendered image. Such a "multi-pass" technique may have various advantages since the gathered light data may, in some examples, be used multiple times during the computation of the image pixels defining the final rendered 2D image. This reuse of information can greatly improve the image quality for a given number of computations. Such reuse of information may also be useful in cases where multiple similar images are to be rendered, for example in rendering stereoscopic images for virtual reality or augmented reality applications or for light field monitors.

Other parameters relating to the physically based rendering of the volumetric dataset relate to the image size relating to a size of the plane for which light data for 3D points in the volume are calculated by path tracing. For example, a plane size X pixels across and Y pixels in height defines that light information is computed for each pixel of a plane X pixels across and Y pixels in height. This light information is generated by tracing paths that originate from each pixel. The image size may be represented as (X, Y).

It is important to note that in the following examples the image size (X, Y) may be considered to be generally independent of the size of the final 2D image to be rendered. This is because for a multi-pass algorithm, as described above, light data relating to 3D points in the volume are computed first, using an image size (X,Y). Then, separately, the pixel values for the final rendered 2D image, which may comprise a different number of pixels to the plane of image size (X, Y), are computed from the light data.

In a rendering technique using a path tracing process employing trajectory splitting with a path splitting number S, temporal reusage with an image reuse number T, and having a given image size parameter X, the total number of paths used to compute the light data which is used as input for the computation of the final 2D image can be computed as $$N = S*T*X^2 \qquad (1)$$

In this example, it is assumed that Y=X, i.e. the image is square, for the purposes of simplicity. However, in general Y≠X. This case can be handled analogously and is discussed below.

The values of the parameters S, T and X thus all affect the number of paths N contributing to an image and are related to the number of paths N as set out in Equation (1).

A performance metric P can also be defined for a given implementation of a physically based rendering process. In one example, a performance metric P is related to the time taken for the process to render an image of a given quality, i.e. an image having a particular value for the number of paths N. In general, the values of S, T and X affect the value of the performance metric P. That is, changing the values of S, T and X may for example change the time taken for an image of a given quality to be rendered. This is to be expected since S and T are parameters for use in techniques for speeding up the rendering and the image size parameter X defines for how many pixels light information has to be computed to be used to render the image.

Using values of S which are greater than 1 has the advantage that the result of the sub-paths can naturally be combined and only the averaged data need be stored. This may reduce the pressure on the memory subsystem when storing the result of the light computation pass. Further, the final pass that accesses the computed light info is simplified since it has to access much less data. On the other hand, increasing the integer number S also may have drawbacks. When multiple paths are combined, this means that for a given total budget of paths N, the image size X must be decreased. However, decreasing X can lead to overall performance losses within a complex multi-pass algorithm that might be larger than the performance gains which are achieved by increasing S.

Similar performance considerations may apply to the value used for the image reuse number T. While it may seem that it would always be better to reuse as much previous light data as possible, for a fixed total budget of paths N, increasing T may lead to a reduction of the image size X. This, as mentioned above, may lead to performance losses for the total multi-pass algorithm.

The present disclosure provides in one example a method of determining an optimal set of values for the set of parameters S, T and X which optimize the performance metric P, which, as discussed above, may be the time to render the image.

Given the above relation between S, T, X and N, set out in equation (1), for a fixed value of the image quality metric N, 2 of S, T and X may be selected freely, while the third one is determined by this selection.

Since S and T may be much smaller numbers than the image size X, in an example method the integer variables S and T are selected, and X is computed from this selection using $$X = \sqrt{\frac{N}{S*T}} \quad (2)$$

The image size X is an integer and not a floating-point number, and thus in examples it is rounded to an integer when equation (2) is used.

The performance metric P may be considered to be a function of S, T and X, such that it may be written as a performance function P(S, T, X) for a given value N. Determining the set of values for the parameters S, T and X which optimizes the performance function P(S, T, X) for a given value of N may be done in a number of ways.

In one example, the performance function P(S, T, X) may be designed to reflect as accurately as possible the performance of the path tracing process implemented on a given rendering apparatus. A suitable numerical algorithm may then be used to find a minimum of the performance function to accordingly determine the optimized set of values for the parameters S, T, and X.

In another example method, the performance function P(S, T, X) is defined as a rendering time for a path tracing method implemented on a given rendering apparatus to render an image having image quality metric N. In one example, the values for the set of parameters S, T and X which minimize the rendering time are found by measuring the rendering time for a given rendering apparatus using different combinations of values for the parameters.

In examples, determining the optimized set of values for the parameters S, T and X comprises determining a function f(N) which takes a value for N as an input and outputs the optimized values $S_{opt}(N)$, $T_{opt}(N)$ and $X_{opt}(N)$.

$$f(N) = (S_{opt}(N), T_{opt}(N), X_{opt}(N)) \quad (3)$$

The above function f(N) being defined, the example method of determining an optimized set of parameters S, T, and X for an arbitrary image quality metric N comprises determining the function f(N).

In one example, the function f(N) may be estimated by determining a value of f(N) for a plurality of values of N and interpolating between these values. For example, f(N) may be evaluated for a plurality of regularly distributed values and a linear interpolation of the $S_{opt}(N)$ and $T_{opt}(N)$ may be performed for values of N between the regularly distributed values and the results then rounded to the nearest integer. As described above, $X_{opt}(N)$ is determinable from the values for $S_{opt}(N)$ and $T_{opt}(N)$ by equation (2).

The function f(N) may be computed, in some examples, for a plurality of different rendering apparatuses, for example different types of setups of hardware for performing the rendering. The type of rendering apparatus can then be detected at runtime and the appropriate function f(N) corresponding with the rendering apparatus selected to allow for an optimal set of values for the given rendering apparatus to be used. For example, a look-up table may be generated storing different versions of the function f(N) in association with a given type of rendering apparatus.

In some instances, when detecting the type of the rendering apparatus, it may be determined that there is no predetermined function f(N) corresponding with the type of the rendering apparatus. This circumstance may be handled in a number of different ways.

In one example, the rendering apparatus may be configured to determine which of the types of rendering apparatus for which a predetermined function f(N) exists is closest to the determined type of rendering apparatus and use the predetermined function f(N) for that rendering apparatus. Thus, for example, a set of values determined for a similar rendering apparatus is used, which may provide some similar benefits to using a set of values specifically determined for the given rendering apparatus.

In another example, a default parameter setting may be used. In one example, the default parameter setting may comprise a set of values which is averaged across the predetermined sets of values. That is, for example, for a given number of paths, the default parameter setting may comprise a default value for the trajectory splitting number which is the average of the values of the trajectory splitting number S across all of the predetermined sets of values, rounded to the nearest integer. Similarly, the default value for the image reusage number T may be the average of the values of the image reusage number across all of the predetermined sets of values, rounded to the nearest integer. The image size X may be determined from S and T as described above and is similarly rounded to the nearest integer.

In another example, the default parameter setting may comprise a set of values which provides for minimizing the sum of the performance metric across the plurality of types of rendering apparatus. So, for example, for a given number of paths, a given set of parameters may result in a different value for the performance metric, e.g. a different rendering time, when employed on each of the rendering apparatuses. The default set of parameters may be the set of parameters for which the sum of the performance metrics when employed on each of the rendering apparatuses is minimized. This may allow for a default parameter setting to be used which has been determined to perform well across all of the rendering apparatuses, on average.

In yet another example, the method of determining the function f(N) may be performed "on the fly" for the determined type of rendering apparatus. In examples, the determined values may then be stored for subsequent use of the given rendering apparatus. This option may be preferable where available since it provides for a set of values to be determined which are specifically selected for optimal use with the given rendering apparatus. However, as will be appreciated, performing such a method of determining the given set of values may add some additional time to the process of implementing the rendering method.

In some examples, the performance function may be designed to take into account that some values of the parameters for use in the path tracing process are preferable to other values.

For example, it may not be preferable to make the trajectory splitting number S arbitrarily large. Beyond a certain point, it may be preferable to add other paths to the path tracing process rather than increasing the trajectory splitting number S. Thus, the number of paths N as set out in equation (1) may be only a valid indicator of the image quality if S does not become too large.

Similarly, for the value of image reusage number T there are cases where a smaller value of T may be preferred compared to a larger value. For example, when reusing light data from previous images it may be necessary to determine if the light data being reused is still valid for the present image to be rendered, or if the data has been invalidated, e.g. by a change to the scene such as a change to the volume or the lighting of the volume. When the scene is subject to change over time, smaller values of T may be preferred, since the older data may become less valuable for reuse. Thus, the number of paths N as set out in equation (1) may also be only a valid indicator of the image quality if T does not become too large.

For the above reasons, a performance metric used in the example methods may take into account the values of S and T. In one example, a performance function used may be defined as follows $$p_{new}(S,T,X)=p(S,T,X)+w_S*S+w_T*T \quad (4)$$

The predetermined criterion for selecting the given set of values for the parameters of the rendering process may then be to minimize the performance function $p_{new}(S,T,X)$. Thus, the performance function has a term $p(S,T,X)$, which may be a rendering time, and further terms $w_S*S$ and $w_T*T$. The addition of the weighted terms acts to penalize larger values of S and T from selection as the set of values for use. The degree to which larger values of S and T are penalized is determined by the respective weighting values $w_S$ and $w_T$.

Preferred values for $w_S$ and $w_T$ may depend on the type of rendering scenario in which the parameters are to be used. For example, in scenarios where the scene is to be rendered changes with time, strategies based on precomputed light-fields, irradiance caches or other acceleration methods may not be particularly appropriate. In such scenarios, it may be important that the parameter T is not excessively large, otherwise a latency may be introduced between changes to the scene being made and those changes being fully reflected in the rendered image. How large the value of T can become before such a latency becomes noticeable may depend on the framerate of the displayed rendered images. In such scenarios, it may be appropriate to use a larger value of the weight $w_T$ to decrease this latency.

For some scene changes it may also be possible to apply a geometrical test to determine if the data for a particular previously traced path has become outdated. If, for example, a geometrical clipping is done, e.g. using a clip plane or a cropbox, a geometrical test may be used in the rendering process that determines if the data from a given previously traced path should be omitted from the data used to render the image. Whether such a test is used may affect the preferred value of T and thus may affect the value assigned to the weight $w_T$.

As mentioned above, at the discussion of Equation (1), in general an image to be rendered may be a number of pixels X wide and a number of pixels Y high. In the case where $Y \neq X$, X and Y may be related by an image ratio R, where $Y=R*X$. The number of paths in this case may be related according to the following equation.

$$N=S*T*R*X^2 \quad (5)$$

While Equation (2) may accordingly be replaced by the following equation.

$$X = \sqrt{\frac{N}{R*S*T}} \quad (6)$$

The method of determining the set of values for the parameters may proceed in the manner described above, the image ratio R being an additional parameter to be taken into account.

In some examples, the image ratio R is known in advance, for example being predetermined based on the intended use of the image. For example, typically, the image ratio R of the image for generating the light data will have the same ratio as the final image to be rendered. This may be the case in particular for virtual reality and augmented reality applications where the image ratio may be defined implicitly by a display hardware which displays the images.

In examples where the image ratio R is not known in advance, example methods may proceed by computing the function f(N) for the special case Y=X, as has been described above. The resulting values for S and T for Y=X may then be used and the value for X scaled with R during the step of using the path tracing process to compute the light data thus using a value of Y=R*X. The image ratio R may, for example, be selected by a user.

It should be noted that for a given rendering apparatus, other factors may influence the set of values for the set of parameters which provides for the minimal rendering time, or otherwise allows the performance metric to fulfil the desired result. For example, features of the dataset being used, the camera position and orientation, the preset used for assigning color and opacity information to voxels of the volume, which may be referred to as the transfer function, and various other internal parameters of the rendering method may affect the given set of values which achieves the desired result. The set of values determined according to example methods described above may therefore, in some examples, be considered a set of values which is intended to allow the performance metric to satisfy the predetermined criterion in a typical usage of the given rendering apparatus. It may typically be the case in some examples that the influence of such other factors such as those mentioned above is much smaller than the type of rendering apparatus, thus providing a set of values for a given rendering apparatus may typically provide a good solution.

Figure 5:
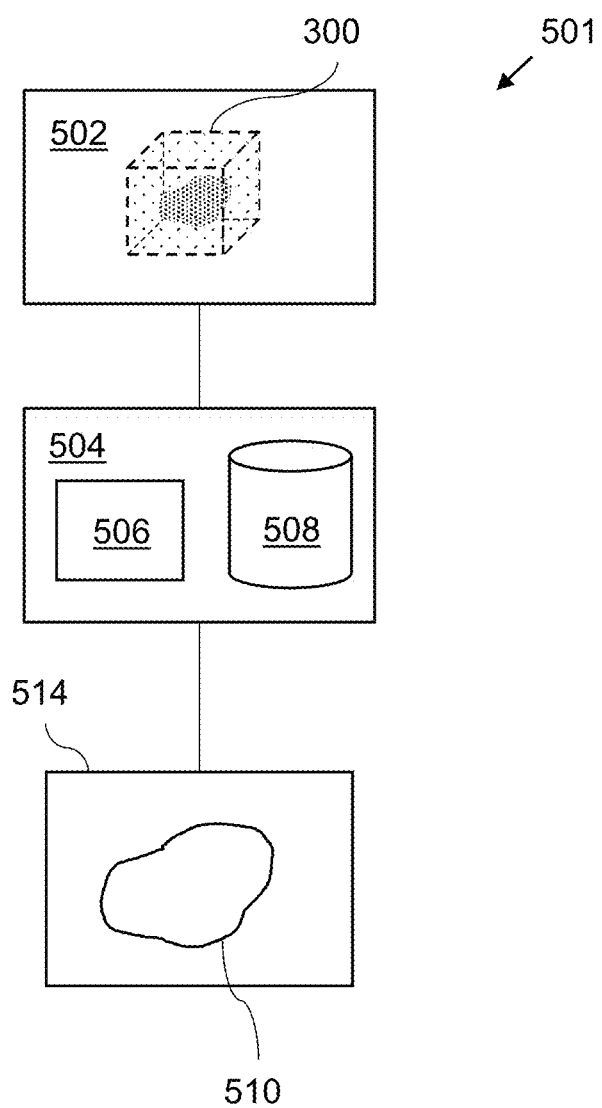
FIG. 5 illustrates schematically an example system comprising a rendering apparatus for performing example methods of rendering described herein.

Referring now to FIG. 5, there is illustrated schematically an example system 501 in which an example rendering apparatus 504 may use methods described herein. The system 501 comprises a scanner 502, the rendering apparatus 504, and a visualization unit 514. In examples, the system may comprise fewer components than or additional components to those illustrated in FIG. 5. For example, the system 501 may comprise a computer network such as the internet.

The scanner 502 may be any scanner for generating a dataset comprising the volumetric dataset 300, which, as described may, for example, be a medical volumetric dataset representing a portion of a patient. For example, the scanner

502 may be a computed tomography (CT) scanner, a magnetic resonance imaging (MRI) scanner, a positron emission tomography (PET) scanner, an ultrasound scanner or the like. In another example the scanner 502 may, for example, be for producing a volumetric dataset representing geological data. The scanner 502 is connected to the rendering apparatus 504, for example via wired or wireless connection. The scanner 502 may be arranged to provide the volumetric dataset to the rendering apparatus 504.

The rendering apparatus 504 comprises a processor 506 and a memory, in the form of a storage 508. The rendering apparatus 504 may, for example comprise a GPU. In this example, the rendering apparatus 504 is arranged to perform the above described method of volume rendering the volumetric dataset 300. The rendering apparatus 504 may also be configured to perform above described methods of obtaining a set of values for a set of parameters to be used in the volume rendering.

Alternatively, the method for obtaining the set of values may be performed by a computer apparatus other than the rendering apparatus 504 and the set of values provided to the rendering apparatus 504. For example, the set of values may be obtained by example methods above to determine a set of presets to be provided to the rendering apparatus for use in the method of volume rendering. A plurality of sets of vales corresponding to different types of rendering apparatus may be obtained, as described above, and the rendering apparatus 504 provided with a look-up table wherein a plurality of sets of values are associated with a respective plurality of types of rendering apparatus. The method of rendering performed by the rendering apparatus 504 may thus comprise determining a type of the rendering apparatus 504 and selecting an appropriate set of values, as described above. Different types of rendering apparatus 504 may, for example, have different processing speeds, for example operating at different GPU or CPU frequencies, and may comprise different memory characteristics, e.g., for latency and bandwidth. These factors may affect which values for the set of parameters provide the minimal rendering time for an image comprising a given number of paths.

The storage 508 may comprise a machine-readable medium comprising a set of machine-readable instructions which when executed by the processor 506 cause the rendering apparatus 504 to perform an example method of obtaining a set of values for use in the path tracing or for a method of rendering using such a set of values to be performed. The program may be stored on a computer readable medium which may be read by the rendering apparatus 504 to thereby execute the program. The rendering apparatus 504 may be arranged to receive directly or indirectly or otherwise acquire from the scanner 502 the volumetric dataset 300.

The storage 508 may also comprise a computer-readable medium comprising one or more sets of values predetermined by an example method described above for use in a method of rendering to be performed by the rendering apparatus 504.

The rendering apparatus 504 may comprise a processor for operating any volume rendering method capable of simulating light transport within the volumetric dataset 300 to perform a physically based rendering process comprising path tracing.

The rendering apparatus 504 may be arranged to transmit information, for example, a color value for each pixel in an image plane, to a visualization unit 514. The transmission may be direct or indirect, for example via a wired connection, a wireless connection, or via the internet.

The visualization unit 514 may comprise visualization software for displaying a two-dimensional projection of the volume 300 produced by the rendering apparatus 504. The visualization unit 514 may comprise a display screen, and one or more graphics hardware or software components. In some examples, the visualization unit 514 may be or comprise a mobile device. In some examples the visualization unit 514 may comprise a virtual reality or augmented reality device. The visualization unit 514 may display a stereo image.

Figure 6A:
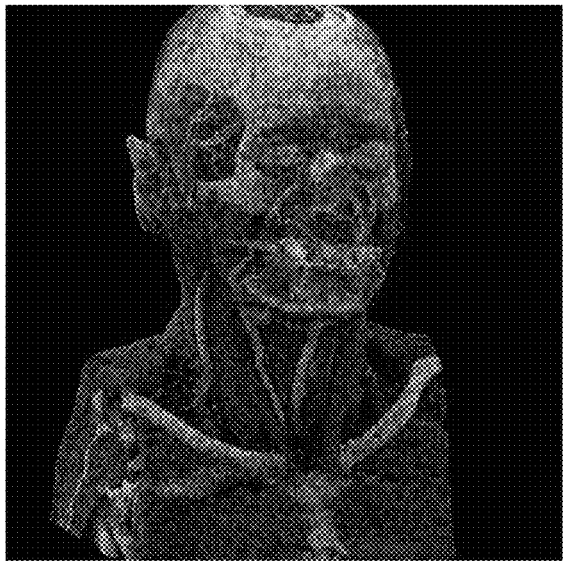
FIGS. 6A to 6D show example images rendered according to a physically based path tracing technique using different number of paths.
Figure 6B:
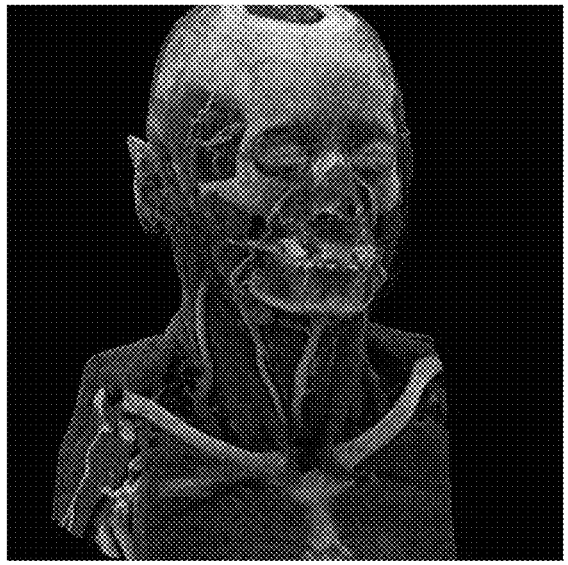
Figure 6C:
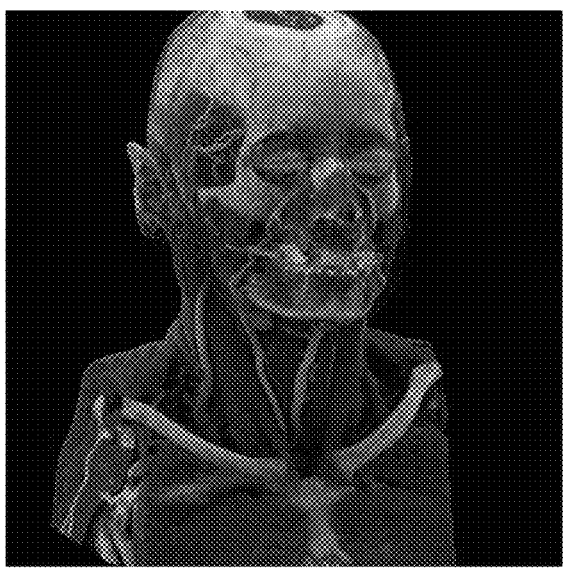
Figure 6D:
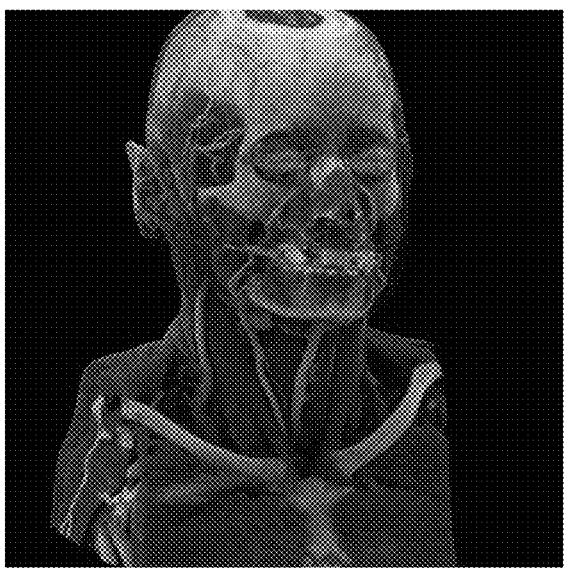

FIGS. 6A, 6B, 6C and 6D show images rendered by an example physical based rendering method as described herein with different values of N. FIG. 6A shows the result for using 750*750 paths, FIG. 6B shows the result for using 2000*2000 paths, FIG. 6C shows the result for 3500*3500 paths, and FIG. 6D shows the result for using 5000*5000 paths. FIG. 6A shows immediately visible artifacts. The images shown in FIGS. 6B, 6C and 6D may be seen to be of progressively increasing quality compared to the image shown in FIG. 6A. In a given method of rendering an image, a value for the number of paths N may be selected or predetermined for a given application. By using a set of parameters determined as described above in examples the rendering time for rendering an image using the given number of paths N may be minimized, or, more generally, a performance metric of the rendering may satisfy a predetermined criterion.

FIG. 7 shows a graph of measured rendering times for images having different numbers of paths N rendered using an NVIDIA Quadro RTX 6000 GPU. The x-direction shows the number of paths N contributing to the image, which may be considered indicative of a quality of the rendered image. The y-direction shows the measured rendering time of the image in milliseconds.

In FIG. 7, Graph1 displays the measured rendering times for a path tracing process that does not allow for trajectory splitting nor for temporal reuse of previous images.

Graph2 displays the measured rendering times when using, at all values of N, a set of values for the trajectory splitting number S, image reusage number T and image size X determined according to an example method described above to provide the minimal rendering time at a value of N of 1000*1000.

Similarly, Graph3 displays the measured rendering times when using, at all values of N, a set of values for the for the trajectory splitting number S, image reusage number T and image size X determined according to an example method described above to provide the minimal rendering time at a value of N of 2000*2000.

Graph4 shows the result when using sets of values for the trajectory splitting number S, image reusage number T and image size X determined according to an example method described above to provide the minimal rendering time at the given value of N being used. That is, in Graph4, the values for the parameters S, T and X were determined as the outputs of a function f(N) determined as described above.

As can be seen from Graph4, the rendering time over the range of tested values N is clearly the lowest compared to the other graphs, in this case being kept to below around 10 ms, when for each value of N a set of values S, T and X determined to be optimal for that value of N is used. The rendering times at different values of N when an optimal set of values for a particular value of N is used over the range of N, such as in Graph2 and Graph3, can in this example be seen to be generally lower than a path tracing process not using trajectory splitting or temporal image reuse as shown in Graph1. However, in Graph2 and Graph3, as the value of N used diverges from the value of N for which the set of values used is optimal, the rendering time can be seen to increase compared to Graph4.

FIGS. 8A, 8B and 8C show comparisons of values determined by methods described above for two different GPUs. FIG. 8A shows the determined values for the trajectory splitting number S for different values of N firstly for an NVIDIA Quadro RTX 4000 GPU and secondly for an NVIDIA Quadro RTX 6000 GPU. The NVIDIA Quadro RTX 6000 is a significantly faster GPU than the NVIDIA Quadro RTX 4000. The Quadro RTX 6000 has more CUDA cores, a higher GPU frequency, a wider memory bus and a higher memory bandwidth than the Quadro RTX 4000. It can be seen that at certain values of N, the determined value of S to provide the minimal rendering time differs between the two types of GPU. The same applies, mutatis mutandis, to FIGS. 8B and 8C which respectively show the image reusage number T and image size X determined to provide the minimal rendering time at different values of N for the same two types of GPU.

As can be seen from FIGS. 8A, 8B and 8C, therefore, for a given image quality level or number of paths N, the values defined by f(N) may strongly depend on the type of GPU present in the system. In this example, the Quadro RTX 6000 has a larger raw computational power as well as a faster memory subsystem and is determined by methods described herein to generally prefer smaller values for S and T but larger values for the image size X. However, it should be noted that the results represented by FIGS. 8A, 8B and 8C are for one particular type of photorealistic rendering algorithm. Applying methods described herein for other types of rendering algorithm using the same rendering apparatus may result in different values being found to provide minimal rendering times.

Example methods described herein may be used in non-medical imaging environments. Any applications using 3D rendering of hybrid volume and surface data, such as computational fluid dynamics, computer assisted design, or manufacturing, may benefit from the ability to handle complex and accurate interactions between a surface and volume in physically based rendering.

The above embodiments are to be understood as illustrative examples of the invention. Other embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of obtaining a set of values for a set of parameters for use in a physically based rendering process to be implemented by a rendering apparatus to render an image of a dataset, the method comprising:
    defining a performance metric indicative of a performance of the rendering apparatus in implementing a physically based rendering process including path tracing to render an image using a number of paths; and
    determining, for the rendering apparatus, the set of values for the set of parameters for which the performance metric satisfies a criterion, wherein the physically based rendering process includes:
        a trajectory splitting technique and the set of parameters includes a trajectory splitting number relating to a number of paths into which a ray traced in the physically based rendering process is split;
        a temporal image reusage technique and the set of parameters includes an image reusage number relating to a number of previously rendered images from which light data created during the physically based rendering process is reused; and
    wherein the set of parameters includes an image size parameter relating to a number of pixels for which light data is computed in the physically based rendering process, wherein the physically based rendering process includes the trajectory splitting technique and the image reusage technique, and wherein the set of parameters includes the trajectory splitting number, the image reusage number, and the image size parameter, and wherein the number of paths used to render the image is related to the set of parameters according to an equation $N = S*T*R*X^2$ wherein:
        N is the number of paths;
        S is the trajectory splitting number;
        T is the image reusage number;
        X is the image size parameter; and
        R is an image ratio relating a width of the image to a height of the image.

2. The method of claim 1, wherein the set of parameters are for use in a physically based volume rendering process to render an image of a volumetric dataset.

3. The method of claim 1, wherein the light data includes light irradiance data for respective positions in the dataset.

4. The method of claim 1, wherein the performance metric relates to a rendering time or a number of computations involved in implementing the physically based rendering process to render the image, and, wherein the criterion is that the performance metric is minimized.

5. The method of claim 1, wherein the determining comprises:
evaluating a value of the performance metric for each of a plurality of combinations of values for the set of parameters; and
selecting as the set of the values for the set of parameters, a combination of values of the plurality of combinations of values which results in the performance metric satisfying the criterion.

6. The method of claim 1, wherein the determining comprises:
determining a performance function configured to output a value for the performance metric for the rendering apparatus when a set of values are input to the performance function; and
determining a minimum value output by the performance function and a set of values which, when input to the performance function, result in the performance function outputting the minimum value; and
selecting the set of values which, when input to the performance function, result in the performance function outputting the minimum value as the set of values.

7. The method of claim 1, wherein determining comprises determining a function configured to output the set of values for a number of paths when the number of paths is input into the function.

8. The method of claim 1, wherein the performance metric comprises:
a first term dependent on a rendering time or on a number of computations involved in implementing the physically based rendering process to render the image; and
one or more weighted terms dependent on one or more respective values of the set of parameters; and wherein the criterion is that the performance metric is minimized.

9. The method of claim 1, wherein the method further comprises performing the determining a plurality of times to obtain a plurality of sets of values for the set of parameters; and wherein each set of values of the plurality of sets of values is a respective set of values for implementing the physically based rendering process by a respective rendering apparatus, of a plurality of different rendering apparatuses.

10. The method of claim 9, wherein the determining comprises determining a respective function, configured to output, for a respective rendering apparatus of the plurality of different rendering apparatuses, the respective set of values for a number of paths when the number of paths is input into the function.

11. A computer readable medium storing a set of instructions which, when performed by a computerized rendering apparatus, cause a method of rendering a dataset by use of a physically based rendering process including path tracing to be implemented by the computerized rendering apparatus, the physically based rendering process including using a set of values for a respective set of parameters of the physically based rendering process;
wherein the set of values is determined such that, when the physically based rendering process is implemented by the computerized rendering apparatus to render an image using a given number of paths, a performance metric indicative of a performance of the computerized rendering apparatus in implementing the physically based rendering process satisfies a criterion;
wherein the set of values is determined from a plurality of sets of values, each respective set of values of the plurality of sets of values corresponding with a respective type of computerized rendering apparatus of a plurality of types of computerized rendering apparatus, and wherein determining the set of values comprises:
determining a type of the computerized rendering apparatus;
determining if the type of the computerized rendering apparatus corresponds with a type of rendering apparatus of the plurality of types of computerized rendering apparatus; and
selecting, upon the type of the computerized rendering apparatus corresponding with a type of computerized rendering apparatus of the plurality of types of computerized rendering apparatus, a respective set of values corresponding to the determined type of the computerized rendering apparatus as the set of values; and
determining, upon the type of the computerized rendering apparatus not corresponding with a type of computerized rendering apparatus of the plurality of types of computerized rendering apparatus, determining the respective set of values based on at least the determined type of the computerized rendering apparatus.

12. The computer readable medium of claim 11, wherein determining of the set of values based on the determined type of the computerized rendering apparatus comprises:
determining a type of computerized rendering apparatus of the plurality of types of computerized rendering apparatus which is most similar to the determined type of the computerized rendering apparatus, and selecting the respective set of values corresponding to the type of computerized rendering apparatus which is most similar to the determined type of the computerized rendering apparatus as the set of values; or
assigning, as the respective set of values, a first set of values, wherein respective values of the first set of values are an average of respective values of two or more sets of values of the plurality of sets of values; or
assigning, as the respective set of values, a first set of values of the plurality of sets of values, wherein the first set of values is provides that a sum of the performance metric of two or more types of computerized rendering apparatus of the plurality of types of computerized rendering apparatus, when using the second set of values in the path tracing process, is minimized; or
determining the respective set of values by determining, for the determined type of the respective computerized rendering apparatus, a set of values for which the performance metric satisfies a criterion.

13. A computer-readable medium storing a set of computer-readable instructions, which when executed by a computer, cause a method of obtaining a set of values for a respective set of parameters for use in a physically based rendering process including path tracing to be implemented by a computerized rendering apparatus to render an image of a dataset to be performed, wherein the method comprises:
defining a performance metric indicative of a performance of a rendering apparatus in implementing a physically based rendering process to render the image using a number of paths; and
determining, for the rendering apparatus, a set of values for the set of parameters for which the performance metric satisfies a criterion, wherein the physically based rendering process includes:
a trajectory splitting technique and the set of parameters includes a trajectory splitting number relating to a number of paths into which a ray traced in the physically based rendering process is split;

a temporal image reusage technique and the set of parameters includes an image reusage number relating to a number of previously rendered images from which light data created during the physically based rendering process is reused; and wherein the set of parameters includes an image size parameter relating to a number of pixels for which light data is computed in the physically based rendering process, wherein the physically based rendering process includes the trajectory splitting technique and the image reusage technique, and wherein the set of parameters includes the trajectory splitting number, the image reusage number, and the image size parameter, and wherein the number of paths used to render the image is related to the set of parameters according to an equation $N=S*T*R*X2$ wherein:

N is the number of paths;
S is the trajectory splitting number;
T is the image reusage number;
X is the image size parameter; and
R is an image ratio relating a width of the image to a height of the image.

14. An apparatus comprising:

a processor; and a storage storing a set of computer-readable instructions which, when executed by the processor, cause the processor to perform obtaining of a set of values for a respective set of parameters for use in a physically based rendering process including path tracing to be implemented by a rendering apparatus to render an image of a dataset, the obtaining of the set of values comprising:

defining a performance metric indicative of a performance of a rendering apparatus in implementing a physically based rendering process to render the image using a number of paths; and determining, for the rendering apparatus, a set of values for the set of parameters for which the performance metric satisfies a criterion, wherein the physically based rendering process includes:

a trajectory splitting technique and the set of parameters includes a trajectory splitting number relating to a number of paths into which a ray traced in the physically based rendering process is split;

a temporal image reusage technique and the set of parameters includes an image reusage number relating to a number of previously rendered images from which light data created during the physically based rendering process is reused; and wherein the set of parameters includes an image size parameter relating to a number of pixels for which light data is computed in the physically based rendering process, wherein the physically based rendering process includes the trajectory splitting technique and the image reusage technique, and wherein the set of parameters includes the trajectory splitting number, the image reusage number, and the image size parameter, and wherein the number of paths used to render the image is related to the set of parameters according to an equation $N=S*T*R*X2$ wherein:

N is the number of paths;
S is the trajectory splitting number;
T is the image reusage number;
X is the image size parameter; and
R is an image ratio relating a width of the image to a height of the image.

15. The apparatus of claim 14, wherein the light data includes light irradiance data for respective positions in the dataset.

* * * * *